(12) United States Patent
Hou et al.

(10) Patent No.: US 12,718,456 B2
(45) Date of Patent: Aug. 25, 2026

(54) VIEW SYNTHESIS WITH LEARNED GAUSSIAN SPLATTING AND WEIGHTED SUM RENDERING

(71) Applicant: QUALCOMM Incorporated, San Diego, CA (US)

(72) Inventors: Qiqi Hou, San Diego, CA (US); Randall Roel Rauwendaal, Larkspur, CO (US); Amir Said, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 148 days.

(21) Appl. No.: 18/896,339

(22) Filed: Sep. 25, 2024

(65) Prior Publication Data

US 2026/0087717 A1 Mar. 26, 2026

(51) Int. Cl.
*G06T 15/00* (2011.01)
*G06T 7/50* (2017.01)
*G06T 7/90* (2017.01)

(52) U.S. Cl.
CPC ................ *G06T 15/00* (2013.01); *G06T 7/50* (2017.01); *G06T 7/90* (2017.01); *G06T 2207/10024* (2013.01)

(58) Field of Classification Search
CPC .............. G06T 15/00; G06T 7/50; G06T 7/90
USPC .......................................................... 345/419
See application file for complete search history.

(56) References Cited

U.S. PATENT DOCUMENTS

2009/0109280 A1* 4/2009 Gotsman .............. H04N 5/2628 348/E7.001
2025/0285364 A1* 9/2025 Wu .......................... G06T 7/55
2025/0308144 A1* 10/2025 Sun ......................... G06T 15/06
2026/0030834 A1* 1/2026 Suvorov ................ G06T 15/08

OTHER PUBLICATIONS

Barron J., et al., "Mip-NeRF 360: Unbounded Anti-Aliased Neural Radiance Fields", Mar. 25, 2022, pp. 1-18.
Chen G., et al., "A Survey on 3D Gaussian Splatting", IEEE Transactions on Pattern Analysis and Machine Intelligence, Jul. 22, 2024, pp. 1-20.
Chen G., et al., "A Survey on 3D Gaussian Splatting", IEEE Transactions on Pattern Analysis and Machine Intelligence, arXiv:2401.03890v4 [cs.CV] Jul. 22, 2024, pp. 1-20.
Ebert D., "Introduction to 3D Gaussian Splatting", Hugging Face, Published Sep. 18, 2023, pp. 1-11.

(Continued)

*Primary Examiner* — Thomas J Lett
(74) *Attorney, Agent, or Firm* — QUALCOMM Incorporated; Espartaco Diaz Hidalgo

(57) ABSTRACT

A system generates initial Gaussian elements defined by parameter sets that include, for each Gaussian element a spherical harmonics (SH) coefficient array, a learnable parameter vector, and a learnable weight vector. The system performs a training process comprising rasterizing current Gaussian elements to generate a rendered image of the scene as viewable from a current camera position, wherein for each Gaussian element of the current Gaussian elements that intersects the camera ray, the system determines an opacity value for a location based on a view-dependent scaling value that depends on the current camera position, a position vector, and the learnable parameter vector.

24 Claims, 7 Drawing Sheets

(56) References Cited

OTHER PUBLICATIONS

Fei B., "3D Gaussian Splatting as a New Era: A Survey", Journal of Latex Class Files, vol. 14, No. 8, Aug. 2015, Jul. 10, 2024, pp. 1-20.
Fridovich-Keil S., et al., "Plenoxels: Radiance Fields without Neural Networks", Dec. 9, 2021, pp. 5501-5510.
Hedman P., et al., "Deep Blending for Free-Viewpoint Image-Based Rendering", ACM Transactions on Graphics, vol. 37, No. 6, Article 257, Nov. 2018, 15 Pages.
Kerbl B., et al., "3D Gaussian Splatting for Real-Time Radiance Field Rendering", SIGGRAPH, ACM Transactions on Graphics, vol. 42, No. 4, Article 1, Aug. 8, 2023, pp. 1-14.
Knapitsch A., "Tanks and Temples: Benchmarking Large-Scale Scene Reconstruction", SIGGRAPH 2017, Jul. 20, 2017, 13 Pages.
Kocabas M., et al., "HUGS: Human Gaussian Splats", Nov. 29, 2023, pp. 1-16.
Levoy M., et al., "Light Field Rendering", Computer Graphics Proceedings (SIGGRAPH 1996), New Orleans, Louisiana, Aug. 4-9, 1996, 12 Pages, Aug. 8, 1996, XP55077048.
Mcguire M., et al., "Weighted Blended Order-Independent Transparency", Journal of Computer Graphics Techniques, vol. 2, No. 2, 2013, Dec. 19, 2013, pp. 122-141.
Mildenhall B., et al., "NeRF: Representing Scenes as Neural Radiance Fields for View Synthesis", arXiv:2003.08934v2 [cs.CV], Aug. 3, 2020, 25 Pages.
Muller T., et al., "Instant Neural Graphics Primitives with a Multiresolution Hash Encoding", arXiv:2201.05989v2 [cs.CV] May 4, 2022, ACM Transactions on Graphics vol. 41, No. 4, Article 102, Jul. 2022, 15 Pages.
Saito S., et al., "Relightable Gaussian Codec Avatars", arXiv:2312.03704v2, May 28, 2024, pp. 1-15.
Shirley P., et al., "Fundamentals of Computer Graphics", Jul. 19, 2005, 621 Pages.
Zwicker M., et al., "EWA Splatting", IEEE Transactions on Visualization and Computer Graphics, vol. 8, No. 3, Jul.-Sep. 2002, pp. 223-239.
International Search Report and Written Opinion—PCT/US2025/046979—ISA/EPO—Dec. 17, 2025.
Malarz D., et al., "Gaussian Splatting with NeRF-based Color and Opacity", ArXiv:2312.13729v4 [cs. CV], Cornell University Library, 201 Olin Library Cornell University Ithaca, NY 14853, Jun. 11, 2024, pp. 1-12, XP091781671, Abstract, figures 1, 2, section 1 "introduction", paragraph 5, p. 2, section 3 "Viewing Direction Gaussian Splatting", pp. 4 to 5, section 6 "Discussion and conclusions".
Radl L., et al., "StopThePop: Sorted Gaussian Splatting for View-Consistent Real-time Rendering", ACM Transactions on Graphics, ACM, NY, US, vol. 43, No. 4, Jul. 19, 2024, pp. 1-17, XP059903328, The Whole Document.
Yu Z., et al., "Gaussian Opacity Fields: Efficient Adaptive Surface Reconstruction in Unbounded Scenes", ArXiv:2404.10772v2 [cs. CV], Cornell University Library, 201 Olin Library Cornell University Ithaca, NY 14853, Sep. 11, 2024, pp. 1-15, XP091869815, section 3.1, section 3.2, equations 8, 9.

* cited by examiner

FIG. 2 - PRIOR ART

VIEW SYNTHESIS WITH LEARNED GAUSSIAN SPLATTING AND WEIGHTED SUM RENDERING

TECHNICAL FIELD

This disclosure relates to systems for image processing.

BACKGROUND

Gaussian splatting is a volume rendering technique that renders 3-dimensional (3D) Gaussian elements to generate 2-dimensional (2D) rendered images. Each of the Gaussian elements is a 3D ellipsoid defined by values of a set of parameters. A value of a maximum opacity parameter of a Gaussian element specifies an opacity at a central position of the Gaussian element. The opacity of the Gaussian element diminishes toward the boundary of the Gaussian element, e.g., according to a Gaussian distribution. To generate a rendered image of a scene from the Gaussian elements, a renderer performs a training process in which the values of the parameters of the Gaussian elements are learned based on differences between rendered images generated from the Gaussian elements with reference images of the scene. A scene is a 3-dimensional area. The process of generating the rendered image includes a step of sorting Gaussian elements along camera rays based on the depth of the Gaussian elements from a virtual camera.

SUMMARY

In general, this disclosure describes techniques for rendering 3-dimensional (3D) scenes. As described herein, a computing system performs a version of 3D Gaussian splatting that is referred to herein as Gaussian splatting with weighted sum rendering (GS-WSR). The GS-WSR process avoids the need for computationally complex sorting of Gaussian elements based on depth while providing high-quality new view synthesis and increasing possibilities for parallelization.

In one example, this disclosure describes a method for generating a rendered image, the method comprising: obtaining, by one or more processors, a plurality of Gaussian elements, wherein, for each Gaussian element of the plurality of Gaussian elements, the Gaussian element is defined by parameter values of a parameter set for the Gaussian element, the parameter set including a learnable parameter vector of the Gaussian element, a learnable weight vector of the Gaussian element comprising one or more learnable weight values, and a spherical harmonics (SH) coefficient array of the Gaussian element, the SH coefficient array of the Gaussian element being an array of 3D color vectors corresponding to SH coefficients; and rasterizing the Gaussian elements to generate a rendered image of a scene as viewable from a camera position, wherein rasterizing the Gaussian elements comprises, for at least one camera ray extending from the camera position: determining an opacity value for a location based on a view-dependent scaling value that depends on the camera position and a learnable parameter vector of a Gaussian element of the plurality of Gaussian elements that intersects the camera ray; determining a view-dependent color vector for the Gaussian element based on the camera position, a position vector of the Gaussian element, and the SH coefficient array of the Gaussian element; calculating a depth term for the Gaussian element based on a depth of the Gaussian element and the learnable weight vector for the Gaussian element; and generating a rendered color vector for a pixel that corresponds to the camera ray based on the opacity value for the Gaussian element, the view-dependent color vector for the Gaussian element, and the depth term for the Gaussian element.

In another example, this disclosure describes a computing system comprising: one or more memories storing a plurality of Gaussian elements, wherein, for each Gaussian element of the plurality of Gaussian elements, the Gaussian element is defined by parameter values of a parameter set for the Gaussian element, the parameter set including a learnable parameter vector of the Gaussian element, a learnable weight vector of the Gaussian element comprising one or more learnable weight values, and a spherical harmonics (SH) coefficient array of the Gaussian element, the SH coefficient array of the Gaussian element being an array of 3D color vectors corresponding to SH coefficients; and one or more processors implemented in circuitry and communicatively coupled to the one or more memories, the one or more processors configured to perform operations comprising rasterizing the Gaussian elements to generate a rendered image of a scene as viewable from a camera position, wherein rasterizing the Gaussian elements comprises, for at least one camera ray extending from the camera position: determining an opacity value for a location based on a view-dependent scaling value that depends on the camera position and a learnable parameter vector of a Gaussian element of the plurality of Gaussian elements that intersects the camera ray; determining a view-dependent color vector for the Gaussian element based on the camera position, a position vector of the Gaussian element, and the SH coefficient array of the Gaussian element; calculating a depth term for the Gaussian element based on a depth of the Gaussian element and the learnable weight vector for the Gaussian element; and generating a rendered color vector for a pixel that corresponds to the camera ray based on the opacity value for the Gaussian element, the view-dependent color vector for the Gaussian element, and the depth term for the Gaussian element.

The details of one or more examples are set forth in the accompanying drawings and the description below. Other features, objects, and advantages will be apparent from the description, drawings, and claims.

DETAILED DESCRIPTION

Figure 1:
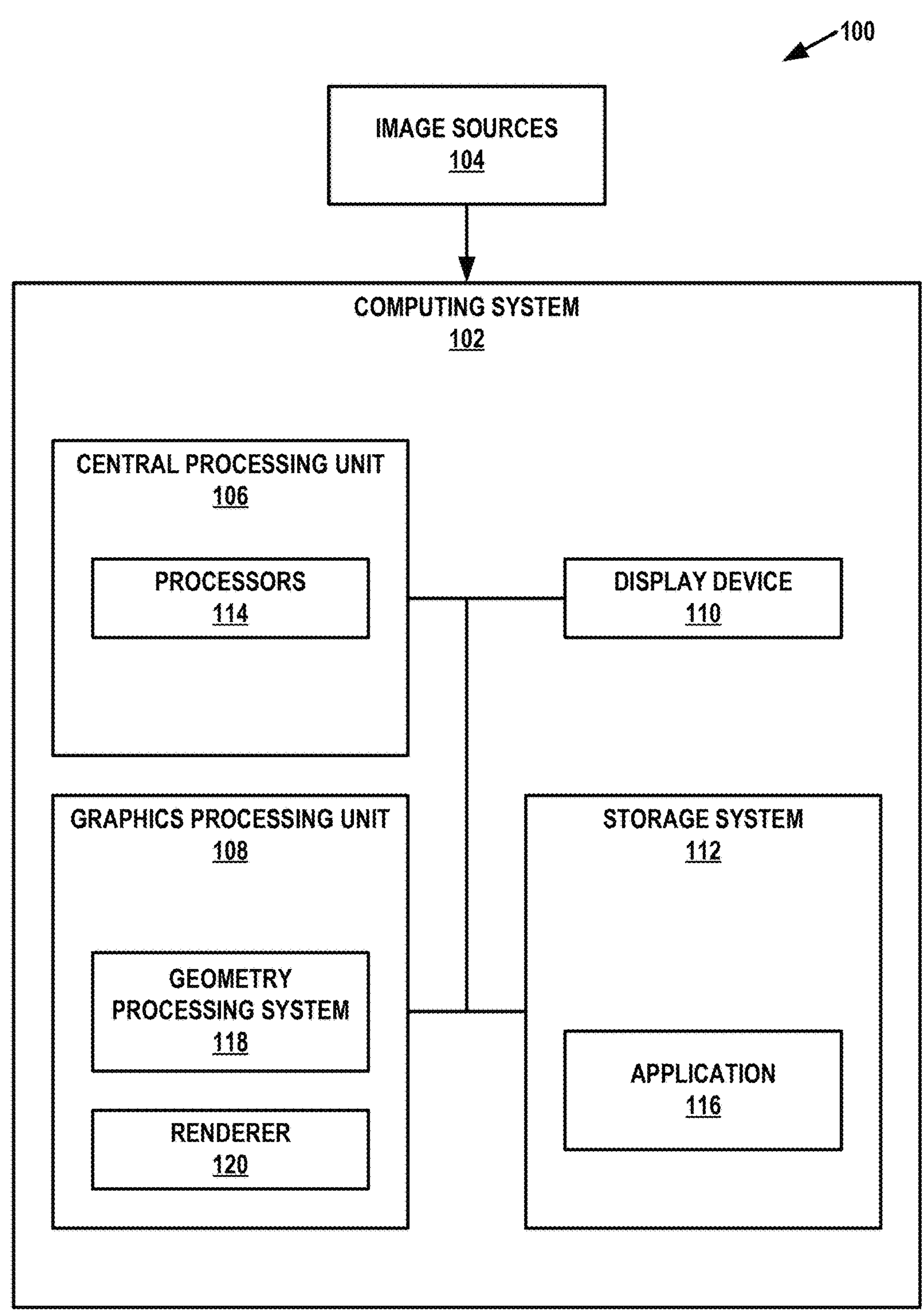
FIG. 1 is a block diagram illustrating an example system according to techniques of this disclosure.

Gaussian splatting is a technique for rasterizing images. Gaussian splatting may enable 3-dimensional (3D) rendering with substantially higher quality and lower complexity than Neural Radiance Field (NeRF) techniques. In Gaussian splatting, a point cloud may be generated based on one or more reference images. Points in the point cloud may then be converted to Gaussian elements. Each of the Gaussian elements is defined by a set of parameters, such as a location of a center of the Gaussian element, a maximum opacity of the Gaussian element, an orientation of the Gaussian element, a set of spherical harmonics coefficients for defining a color of the Gaussian element, and so on. A rendered image is then generated based on the Gaussian elements. To generate the rendered image, a color vector is determined for each pixel of the rendered image. To determine the color vector for a pixel, the Gaussian elements along a camera ray from the pixel through a virtual aperture of a virtual camera are identified and sorted based on depth from the virtual aperture. Opacity-scaled color vectors for each of the identified Gaussian elements are then determined and composited to determine the color vector for the pixel. After generating the rendered image, a training process occurs in which the values of the parameters of the Gaussian elements are adjusted to reduce differences between the rendered image and a reference image. The rasterizing and training processes may be repeated multiple times.

Gaussian splatting employs Gaussian elements with varying levels of opacity which are rendered using alpha-blending techniques. This means that Gaussian splatting cannot use efficient conventional methods that employ depth buffers for rendering opaque objects, and instead require, for each view rendering, pre-sorting the Gaussian elements according to their distance from the virtual camera. Furthermore, the sorting techniques must be especially designed to enable efficient parallel rendering. Since 3D scenes commonly need millions of Gaussian elements for good reproduction quality, the sorting pass and related overheads can take a significant amount of rendering time (e.g., more than 50%).

This disclosure describes techniques that address these problems. Specifically, this disclosure describes a new rendering technique to be used with Gaussian Splatting, called Weighted Sum Rendering (GS-WSR). GS-WSR replaces alpha compositing with summations of pixel values weighted according to depths of Gaussian elements from a virtual camera. This preserves most of the Gaussian splatting algorithm and its features, but eliminates the need for pre-rendering sorting, and instead may only need a fast final pass for per-pixel normalizations. With those modifications, rendering can be much more easily and efficiently parallelized on specialized Graphics Processing Unit (GPU) hardware.

Since the rendering process is modified, the Gaussian splatting parameters optimized for the original method cannot be reused for GS-WSR. This disclosure therefore discloses new training techniques with new optimizations that exploit the parallelization enabled by removing sorting. The GS-WSR techniques of this disclosure can preserve very similar visual quality of novel views, with lower computational complexity.

In one example, this disclosure describes techniques for generating a rendered image. In accordance with the techniques of this disclosure, a renderer may obtain one or more reference images of a scene, wherein each of the one or more reference images is associated with a camera position from which the reference image is virtually or physically captured. The renderer may generate, based on the one or more reference images, a plurality of initial Gaussian elements. For each Gaussian element of the plurality of initial Gaussian elements: the Gaussian element is defined by parameter values of a parameter set for the Gaussian element, the parameter set includes a spherical harmonics (SH) coefficient array of the Gaussian element, a learnable parameter vector of the Gaussian element, and a learnable weight vector of the Gaussian element. The parameter set may also include a position vector of the Gaussian element, an orientation vector of the Gaussian element, a scale vector of the Gaussian element. The position vector of the Gaussian element defines a center position of the Gaussian element in a 3-dimensional (3D) space. The orientation vector of the Gaussian element defines an orientation of the Gaussian element in the 3D space. The scale vector of the Gaussian element defines a size and shape of the Gaussian element in the 3D space. The SH coefficient array of the Gaussian element is an array of 3D color vectors corresponding to SH coefficients. Furthermore, the renderer may perform one or more iterations of a training process. As part of performing each of the one or more iterations of the training process, the renderer may rasterize current Gaussian elements to generate a rendered image of the scene as viewable from a current camera position. During at least an initial iteration of the one or more iterations, the initial Gaussian elements are the current Gaussian elements and the current camera position is the camera position associated with a current reference image. Rasterizing the current Gaussian elements may comprise, for each camera ray of a plurality of camera rays extending from the current camera position, for each Gaussian element of the current Gaussian elements that intersects the camera ray: determining an opacity value for a location based on the position vector of the Gaussian element, the orientation vector of the Gaussian element, the scale vector of the Gaussian element, and a view-dependent scaling value, wherein the view-dependent scaling value depends on the current camera position, the position vector of the Gaussian element, and the learnable parameter vector; determining a view-dependent color vector for the Gaussian element based on the current camera position, the position vector of the Gaussian element, and the color vectors of the Gaussian element. Furthermore, the renderer may generate a rendered color vector for a pixel in the rendered image that corresponds to the camera ray. As part of generating the rendered color vector for the pixel, the renderer may, for each Gaussian element of the current Gaussian elements that intersects the camera ray, calculate a depth term for the Gaussian element based on a depth of the Gaussian element and the learnable weight vector for the Gaussian element. Additionally, the renderer may generate the rendered color vector for the pixel based on the opacity values for the current Gaussian elements that intersect the camera ray, the view-dependent color vectors for the current Gaussian elements that intersect the camera ray, and the depth terms for the current Gaussian elements that intersect the camera ray. The renderer may adjust the parameter values of the parameter sets of the current Gaussian elements based on differences between the rendered image and the current reference image. A final rendered image is a rendered image generated by rasterizing final Gaussian elements. The final Gaussian elements are the current Gaussian elements of a final iteration of the one or more iterations of the training process.

FIG. 1 is a block diagram illustrating an example system 100 according to techniques of this disclosure. In various examples, system 100 may be part of a computing device, video gaming console, smartphone, mobile device, computing device, vehicle, robot, or other type of device. System 100 includes a computing system 102. Additionally, in the example of FIG. 1, system 100 may include one or more image sources 104. Computing system 102 may include one or more computing devices, such as personal computers, chipsets, mobile devices, or other types of devices.

Image sources 104 are configured to generate image data, such as Red-Green-Blue (RGB) images or images in other color spaces. Image sources 104 may be positioned at various locations around system 100. For instance, in an example where system 100 is a vehicle, image sources 104 may include two or more forward-facing image cameras, two or more rear-facing image cameras, and so on. In some examples, image sources 104 include depth cameras that are configured to generate depth images. Depth images represent the depths of objects. In some examples, there is a depth camera for each of image sources 104. For instance, in an example where image sources 104 include a left image camera and a right image camera, the depth cameras may include a left depth camera corresponding to the left image camera and a right depth camera corresponding to the right image camera. In other examples, there are multiple image sources 104 and a single depth camera. Depth images generated by a depth camera may represent the depths of objects shown in images generated by an image camera corresponding to the depth camera.

In the example of FIG. 1, computing system 102 includes at least one central processing unit (CPU) 106, at least one graphic processing unit 108, a display device 110, and a storage system 112. CPU 106, GPU 108, display device 110, and storage system 112 may be communicatively coupled. CPU 106 includes one or more processors 114. Processors 114 may be implemented in circuitry. Example types of processors 114 may include microprocessors, digital signal processors, application-specific integrated circuits (ASICs), and so on. Display device 110 may include display screens, extended reality display devices, and other devices for displaying output. Storage system 112 may include one or more non-transitory computer-readable storage media. Example types of non-transitory computer-readable storage media may include random access memory (RAM) units, disk drives, and so on. CPU 106, GPU 108, display device 110, and the computer-readable storage media of storage system 112 may be distributed among two or devices of computing system 102 or may be consolidated within a single device of computing system 102.

Storage system 112 may be configured to store various types of data and computer-readable instructions. In the example of FIG. 1, storage system 112 stores data and instructions associated with an application 116. Application 116 may be one of a variety of different types of application, such as a video game application, a graphics design application, a 3D rendering application, and so on. Processors 114 of CPU 106 may execute application 116 to generate geometry data. The geometry data may include 3D meshes and textures.

In the example of FIG. 1, GPU 108 includes a geometry processing system 118 and a renderer 120. Geometry processing system 118 may include one or more processors that perform a geometry processing step of a graphics pipeline in order to generate a set of primitives based on the geometry data. Renderer 120 may include one or more processors that perform a rasterizing step of the graphics pipeline in order to generate one or more rendered images. A rendered image is a 2-dimensional (2D) image, such as a 2D image suitable for display on a display screen. In some examples, display device 110 displays one or more of the rendered images. In some examples, storage system 112 stores one or more of the rendered images.

In accordance with one or more techniques of this disclosure, renderer 120 uses a technique referred to herein as Gaussian splatting with weighted sum rendering (GS-WSR) to generate rendered images. As discussed above, the GS-WSR technique may obviate the need for sorting Gaussian elements based on their depths, which may improve computational efficiency and may enable greater parallelization of the Gaussian splatting rendering process.

Figure 2:
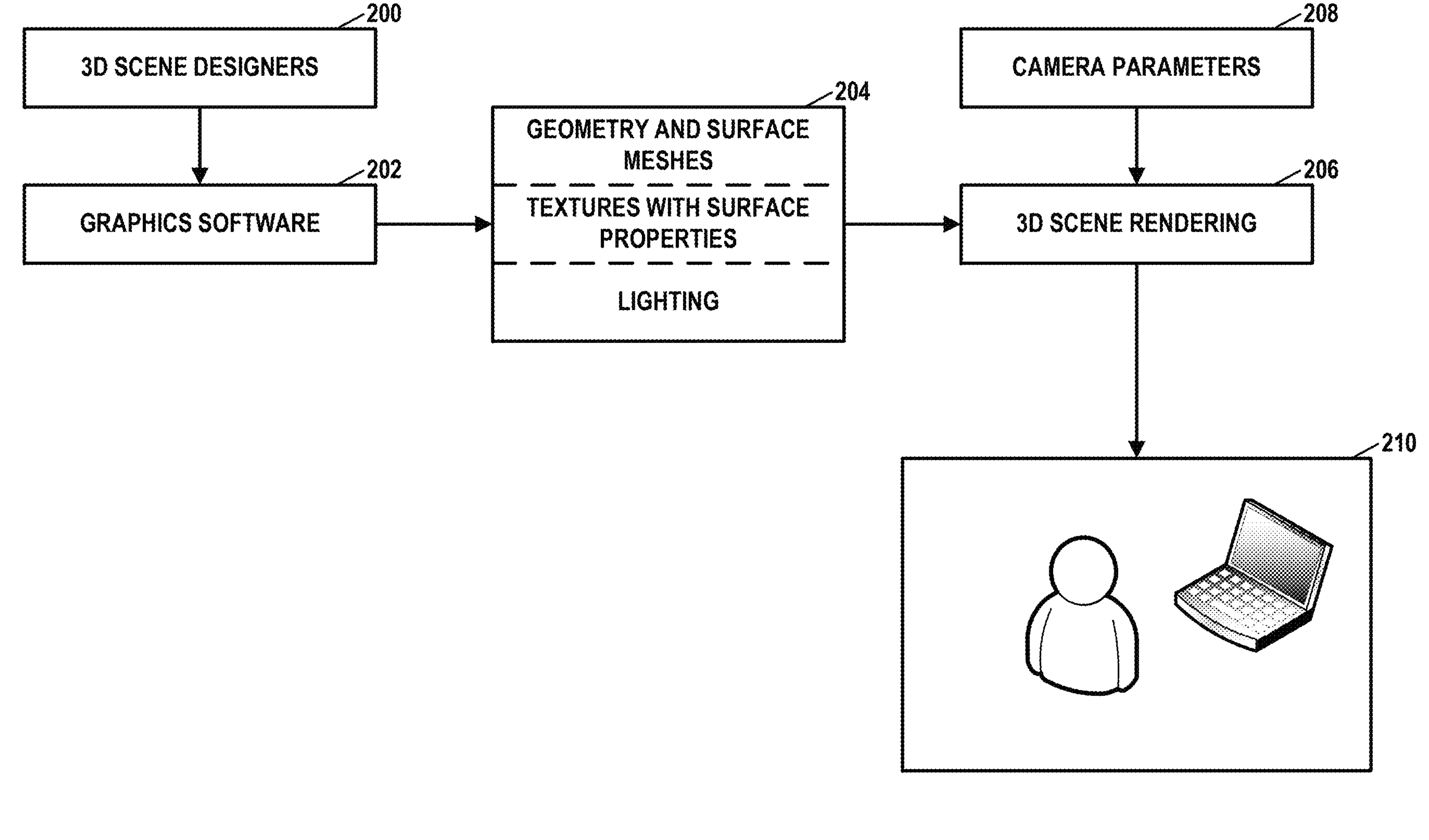
FIG. 2 is a block diagram illustrating an example process for generating views from a 3D scene using conventional computer graphics techniques.

FIG. 2 is a block diagram illustrating an example process for generating views from a 3D scene using conventional computer graphics techniques. In the example of FIG. 2, 3D scene designers 200 are humans that design 3D scenes using graphics software 202. Graphics software 202, such as application 116 (FIG. 1), generates a 3D scene representation 204. The 3D scene representation 204 represents the 3D scene in terms of geometry and surface meshes of 3D objects in the 3D scene, textures with surface properties, and lighting parameters. The scene geometry and object meshes define the locations and shapes of all objects in the scene. In general, it is expensive to create geometric models for complex objects and materials, such as fur and hair, folded fabric, wrinkles, and plants. The textures with surface properties define the appearance of each object's surface, with parameters to indicate how the appearance changes according to lighting and viewing direction. In general, it is difficult to convincingly reproduce materials with appearance defined by complex light interactions, like human skin, eyes and hair, reflective surfaces, thin leaves, etc. The lighting parameters specify locations of light sources and other information about the light sources. In other words, the lighting parameters define which objects correspond to light sources, the amount of light, surface shading, and object shadows. Light distribution in natural scenes is defined by many interactions between light sources and objects. Conventional scene rasterizations can produce poor approximations and need many complex tricks to represent even basic effects like shadows and reflections. Physically based ray-tracing rendering methods yield better approximations but are computationally complex.

A 3D rendering process 206 uses 3D scene representation 204 and camera parameters 208 to generate a rendered view 210 of the 3D scene. The camera parameters 208, which may also be referred to as "view parameters" may specify a location of a virtual aperture of a virtual camera along with a field of view of the virtual camera (e.g., a direction of a central axis of the virtual camera).

The result of all those limitations is that, despite large costs, rendered scenes tend to be easily identified as artificial. In fact, even scenes rendered with very complex and slow methods can appear to be artificial because they can look strange or "too perfect and clean," and to improve realism it may be necessary to have human intervention for identifying and fixing each problem. There is extensive research on using machine learning techniques to streamline the generation of 3D scene models but with limited success because conventional graphics representations were created for human designers and specific graphics hardware, making them difficult to integrate into machine learning techniques.

Figure 3:
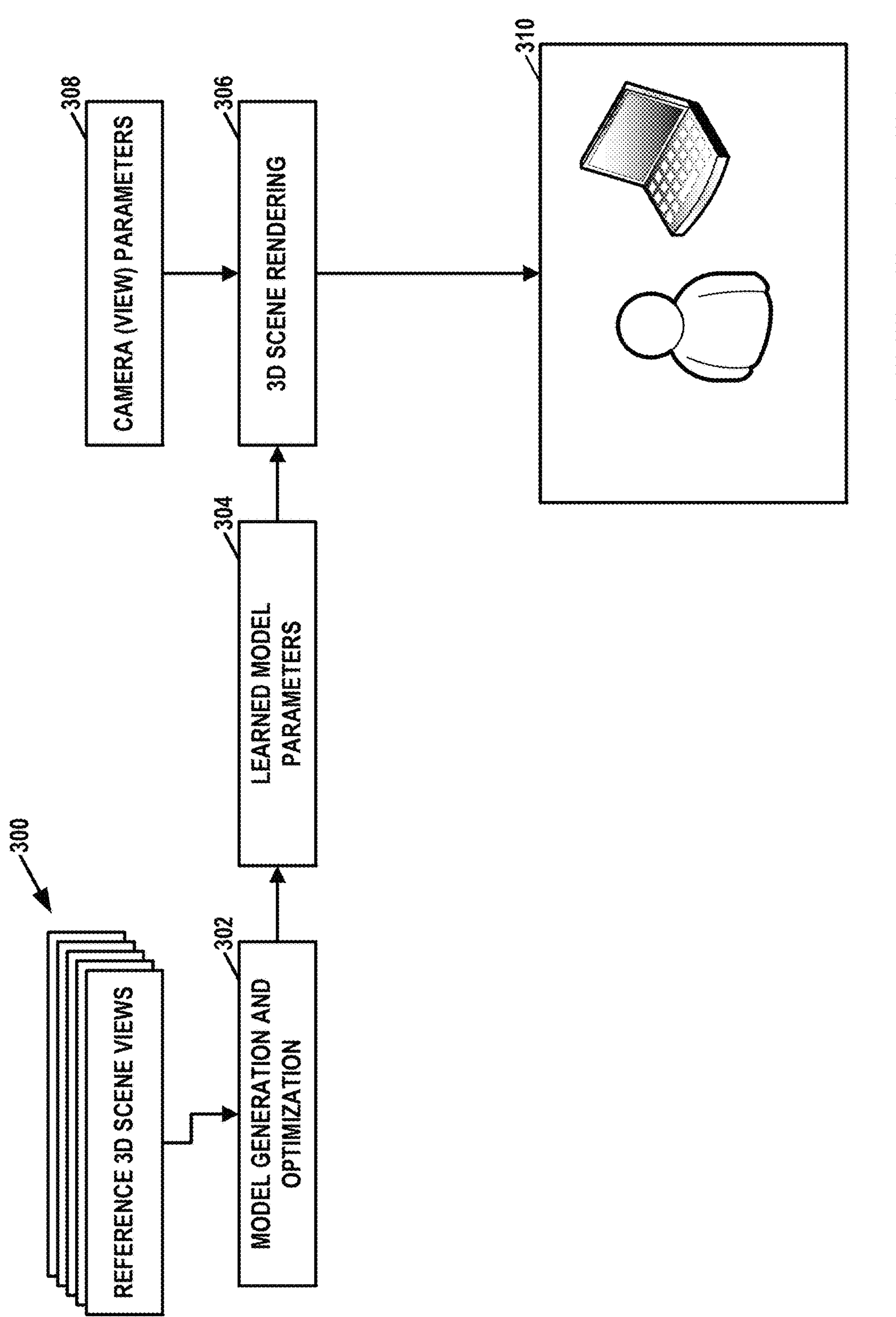
FIG. 3 is a block diagram illustrating an example process for generating views from a 3D scene using machine learning techniques and models, in accordance with one or more techniques of this disclosure.

A different approach is to reproduce views from a natural scene, instead of creating one with an artificial graphics representation. This approach, called novel view synthesis, can be implemented exploiting properties of radiance fields, which are also known as light fields, using a scheme as shown in FIG. 3. FIG. 3 is a block diagram illustrating an example process for generating views from a 3D scene using machine learning techniques and models, in accordance with one or more techniques of this disclosure. Novel view synthesis based on radiance field representations is commonly used for real scenes or objects, since they are typically defined from sets of scene views (images or videos). A theoretical advantage is that this avoids most of the limitations of conventional graphics related to realism since those views capture all the very complex information about geometry, shapes, illumination, and material properties, directly from the real scene.

In the example of FIG. 3, a training system obtains multiple reference 3D scene views 300. Each of reference 3D scene views 300 may be a view (e.g., 2D image) of the same scene with different camera parameters. The training system performs a model generation and optimization process 302 that trains a machine learning model to reconstruct reference 3D scene views 300. As part of training the machine learning model, the training system provides camera parameters of one of the reference 3D scene views as input to the machine learning model and receives a generated view as output from the machine learning model. The training system adjusts (i.e., learns) model parameters 304 of the machine learning model to reduce differences between the generated view and the reference 3D scene views. The training system may repeat this process multiple times. After completion of the training process, a 3D scene rendering process 306 uses the trained machine learning model, with a set of camera parameters 308 as input, to generate a view 310 of the 3D scene as the 3D scene would be seen from a virtual camera defined by camera parameters 308. The camera parameters 308 used for generating view 310 may be different from the camera parameters associated with any of reference 3D scene views 300.

The first methods using the approach of FIG. 3 did not create more efficient scene representations, and instead only preserved all recorded views and to generate new scene views, simply resampled (interpolated) the multi-dimensional radiance field. This is computationally inefficient, and because it requires complex view interpolation, it is difficult to consistently obtain high quality. A recent breakthrough was the development of a machine learning technique called NeRF to create models using neural networks. NeRF is based on a type of neural network representation where the information about the 3D scene is implicitly represented using network weights learned for each 3D scene, with a technique called positional encoding. NeRF-based techniques can efficiently generate interpolated samples of the radiance field, and thus can create views with a rendering technique similar to raytracing. That work demonstrated that machine learning techniques can be employed for developing much better techniques for novel view synthesis. However, the computational complexity of NeRF-based techniques is relatively high, and it is difficult to guarantee good quality.

Currently, most of the interest on solutions based on the scheme of FIG. 3 moved to a new, more efficient method, called 3D Gaussian Splatting (3DGS), which is the basis for the techniques of this disclosure. 3DGS uses a different approach from the NeRF-based techniques to represent radiance fields. 3DGS does not use neural networks but instead employs machine learning techniques to optimize parameters of a modified volumetric rendering method.

The approach of FIG. 3 may be adapted for 3DGS and GS-WSR. With 3DGS, a scene model is defined by a quantity N of Gaussian elements. Each of the Gaussian elements is a graphical element having a location, shape, opacity following an equation similar to Gaussian probability distributions, and with ellipsoidal shape. Gaussian elements may be referred to simply as Gaussians, Gaussian Splatting elements, or graphics elements.

Figure 4:
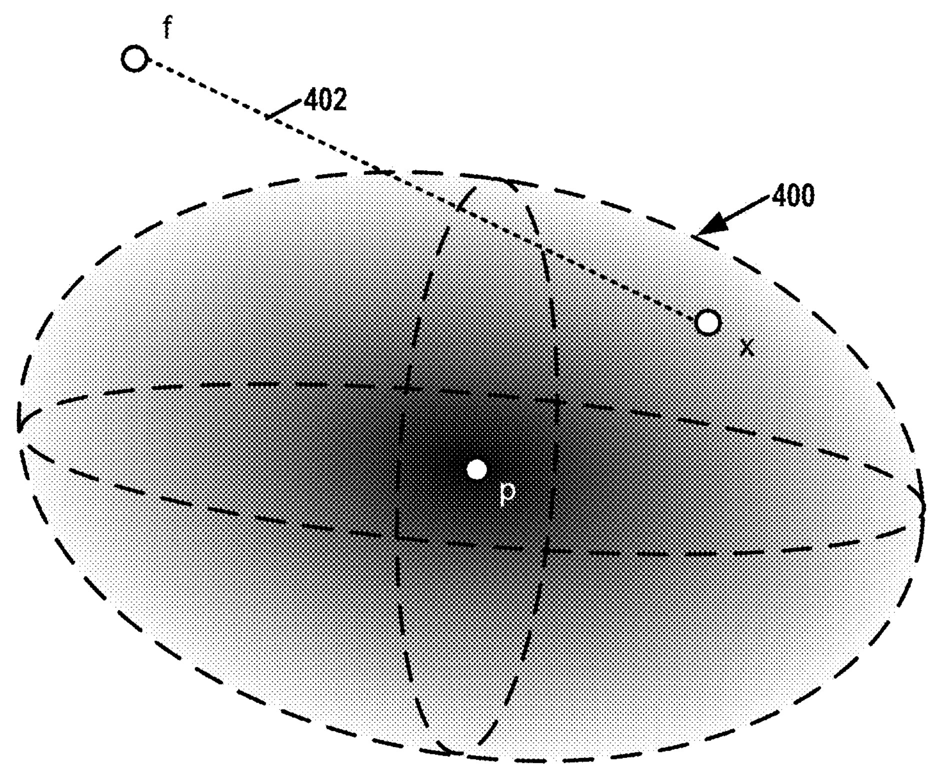
FIG. 4 is a conceptual diagram illustrating an example of a distribution of opacity and color of a Gaussian element and its ellipsoidal shape.

FIG. 4 is a conceptual diagram illustrating an example of a distribution of opacity of a Gaussian element 400 and its ellipsoidal shape. A parameter p corresponds to a center position of Gaussian element 400. As shown in FIG. 4, an opacity of Gaussian element 400 is greatest at the center position of Gaussian element 400 as diminishes further from the center position of Gaussian element 400. In some examples, the opacity diminishes following an equation similar to Gaussian probability distributions.

Parameter values of a parameter set of Gaussian element 400 define the Gaussian element 400. The parameters in the parameter set of Gaussian element 400 may include:

- $p_i$ is the center position of Gaussian element with index i.
- $t_i \in [0,1]$ is the Gaussian element's maximum opacity.
- $q_i$ is a quaternion defining the spatial orientation (rotation) of the Gaussian element.
- $s_i$ is a scale vector defining size and shape of the ellipsoid of the Gaussian element.
- $H_i$ is a matrix with columns composed of 3D color vectors corresponding to spherical harmonics (SH) coefficients. This disclosure may refer to $H_i$ as an SH coefficient array.

From those parameters, the following elements may be determined:

- $\Sigma$ is a 3×3 matrix similar to the covariance matrix in Gaussian probability distributions.
- c is a 3-dimensional view-dependent color vector for the Gaussian element, computed using spherical harmonics.

The three dimensions of color vector c may correspond to three different color component values, such as a red value, a green value, and a blue value, that specify a color for the Gaussian element. The color vector c is view-dependent in the sense that the Gaussian element may appear to have different colors dependent on a position from which the Gaussian element is viewed, e.g., due to reflections. The view-dependent color vector c for the Gaussian element may be derived from a camera position f, the center position $p_i$ of the Gaussian element, and the SH coefficient array $H_i$ of the Gaussian element. The camera position f and the center position $p_i$ may each be a vector of spherical coordinates $(\theta,\phi)$. Thus, a viewing direction vector comprising a $\theta$ and a $\phi$ coordinate value that defines a viewing direction from the camera position f to the center position $p_i$ may be described as $(f-p_i)$. Therefore, the view-dependent color vector c for a Gaussian element i having central position $p_i$ from camera position f may be written as $c_i(f-p_i, H_i)$ or simply $c(f-p_i, H_i)$.

In conventional 3DGS processes, $H_i$ includes up to 16 spherical harmonics coefficients per color vector component (e.g., 16 spherical harmonics components for red, 16 spherical harmonics components for green, and 16 spherical harmonics components for blue). A renderer may calculate a value of a color component in the view-dependent color vector c based on a linear combination LC of a set of terms $Y_1 \ldots Y_{max}$ scaled by the spherical harmonics coefficients in $H_i$ for the color component. That is, the renderer may calculate the linear combination $LC_{i,j}$ for Gaussian element i and color component j as:

$$LC_{i,j} = H_{i,j,1}Y_1 + H_{i,j,2}Y_2 + \ldots H_{i,j,max}Y_{max},\quad j = 1, 2, 3, \tag{1}$$

Equation (1) may be rewritten as follows:

$$c_i = H_i y, \tag{2}$$

wherein $H_{i,j,1}$, $H_{i,j,2}$, etc., are spherical harmonics coefficients for Gaussian element i in $H_i$ for the color component j. Each of the terms in vector y may be defined by the following spherical harmonics equation:

$$Y_l^m(\theta, \phi) = \frac{(-1)^l}{2^l l!}\sqrt{\frac{(2l+1)(l+m)!}{4\pi(l-m)!}}\, e^{im\phi}(\sin\theta)^{-m}\frac{d^{l-m}}{d(\cos\theta)^{l-m}}(\sin\theta)^{2l} \tag{3}$$

In equation (3) above, the values (θ,ϕ) specify the viewing direction vector derived from f and $p_i$. The values I and m are the degree and order of the spherical harmonics equation, where −l≤m≤l. Thus, in an example where there are 16 spherical harmonics coefficients, the maximum value of l is 3, and when l is 0, m is 0; when l is 1, m is 1, 0, −1; when l is 2, m is 2, 1, 0, −1, −2, and so on. Thus, $Y_1$ may correspond to l being 0 and m being 0, $Y_2$ may correspond to l being 1 and m being 1, $Y_3$ may correspond to l being 1 and m being 0, $Y_4$ may correspond to l being 1 and m being −1, $Y_5$ may correspond to l being 2 and m being 2, and so on. With respect to conventional red-green-blue (RGB) values, the renderer may calculate the value of a color component in the view-dependent color vector c by applying a sigmoid function to LC and multiplying by a dynamic range scaling factor, such as 255.

To generate a rendered image based on Gaussian elements, a renderer may determine color values of pixels in the rendered image. A rendered image is a type of digital image that is composed of a grid of individual pixels, each with its own color vector. Each pixel is associated with a camera ray extending from the pixel through a virtual aperture of a virtual camera. In conventional 3DGS rendering, for each pixel of the rendered image, the renderer may identify Gaussian elements that intersect the camera ray associated with the pixel and sort the identified Gaussian elements based on a depth from the virtual camera. For each of the identified Gaussian elements, the renderer calculates an opacity value for a location within the Gaussian element based on the position vector of the Gaussian element, the maximum opacity of the Gaussian element, the orientation vector of the Gaussian element, and the scale vector of the Gaussian element. Conventionally, the renderer calculates the opacity value (α) for 3D location x along the camera ray within a Gaussian element i (i.e., $\alpha_i(x)$) as follows:

$$\alpha_i(x) = t_i \exp\left(-\frac{(x-p_i)^T[\Sigma(q_i, s_i)]^{-1}(x-p_i)}{2}\right),\quad i = 1, 2, \ldots, N, \tag{4}$$

In equation (4) and throughout this disclosure, the exp function is $e^x$, where e is Euler's number, $( \ldots )^T$ indicates matrix transposition, $[ \ldots ]^{-1}$ indicates a matrix inversion, and N indicates the total quantity of identified Gaussian elements that intersect the camera ray. In general terms, equation (4) scales the maximum opacity value ($t_i$) of the Gaussian element based on a Gaussian distribution function according to a distance of the location x from a center $p_i$ of the Gaussian element. The location x may be defined as a vector of coordinates, e.g., spherical coordinates, Cartesian coordinates, etc.

When processing a location x within a Gaussian element, the renderer also calculates a view-dependent color vector c for the Gaussian element. The view-dependent color vector c may include color component values that define a color for the Gaussian element, such as red, green, and blue values. Considering a virtual camera with a focal point (i.e., virtual aperture) at position f, the renderer may calculate an alpha-scaled color vector $r_i$ for Gaussian element i. The alpha-scaled color vector $r_i$ specifies a contribution of a location x within the Gaussian element i to a color of a pixel. The alpha-scaled color vector may be calculated using the following formula:

$$r_i(x, f) = \alpha_i(x)c(f - p_i, H_i),\quad i = 1, 2, \ldots, N. \tag{5}$$

Thus, equation (5) determines an alpha-scaled color vector r for a location x viewed from position f by scaling the view-dependent color vector c of a Gaussian element i that contains the location x based on the previously determined opacity value for the location x (i.e., $\alpha_i(x)$). The view-dependent color vector c may be determined using a spherical harmonics equation based on the SH coefficient matrix $H_i$ of the Gaussian element and the differences between coordinates the center position of the Gaussian element ($f-p_i$) as described above. The view-dependent color vector of a Gaussian element may be dependent on the viewing position f because of the directions of light sources, which can cause shadows, reflections, and other optical effects.

In the example of FIG. 4, the renderer may calculate an opacity value of a location x within Gaussian element 400 that intersects a camera ray 402 extending from a camera position f. The renderer may also determine the view-dependent color vector of Gaussian element 400 based on camera position f and the center position p.

Depending on the size and orientation of a Gaussian element and a discretization of the 3D space into discrete locations, there may be multiple locations along the camera ray that intersect the same Gaussian element. Hence, the renderer may calculate multiple opacity values and color vectors for the same Gaussian element. The renderer may use these opacity values and color values in a rendering equation for determining a color vector of a pixel of a rendered image. However, for ease of explanation, this disclosure and the equations thereof assume that there is only one location per Gaussian element.

An advantage of using the formula of equation (4) is that mapping Gaussian elements to the 2D rendered image can be approximated by a 2D Gaussian element with a 2×2 covariance matrix that can be computed as $$\textstyle\sum_{2D} = J\,W \sum_{3D} W^T J^T, \tag{6}$$

where W is a matrix defined by the camera's image-generation transformation, and J is the Jacobian matrix defined by an affine approximation of the projective camera transformation.

For ease of explanation, this disclosure omits some details about how rendering is discretized for image pixels, and considers that, for all Gaussian elements, there are opacity values $\alpha_i[m,n]$ and color vectors $c_i[m,n]$ defined for each image pixel with integer image coordinates [m,n]. The image coordinates of a pixel indicate a 2D location of the pixel within a rendered image. In other words, each pixel of a rendered image is identified by a set of coordinates m and n. Due to the transparency of Gaussian elements, before a scene is rendered it is conventionally necessary to sort the Gaussian elements according to their distance from the camera position f. Formally, it is conventionally necessary to determine a sorting sequence s[k] of indexes of Gaussian elements according to increasing distance, i.e., such that $$k \geq l \Rightarrow \|f - p_{s[k]}\| \geq \|f - p_{s[l]}\|,\ k, l = 1, 2, \ldots, N. \tag{7}$$

In equation (7), the double straight brackets (i.e., || . . . ||) indicate Euclidean distance.

Thus, the renderer conventionally processes locations (e.g., Gaussian elements) along the camera ray associated with a pixel in an order from closest to the virtual camera to further from the virtual camera. Hence, if the opacity values of locations within the Gaussian elements intersected by the camera ray associated with the pixel reach a level corresponding to complete opacity, later Gaussian elements that intersect the camera ray do not contribute to the color vector of the pixel. Hence, the renderer can skip processing of locations along the camera ray associated with the pixel that intersect the later Gaussian elements.

The renderer may compute a final color vector for a pixel based on the opacity values and the view-dependent color values for the locations along the camera ray associated with the pixel. For instance, after sorting the Gaussian elements based on depth, the renderer may compute a rendered color vector r for the pixel according to the following equation, which corresponds to the well-known computer graphics technique of alpha-blending:

$$r[m, n] = \sum_{k=1}^{N} c_{s[k]}[m, n]\, \alpha_{s[k]}[m, n] \sum_{l=1}^{k-1} (1 - \alpha_{s[l]}[m, n]), \tag{8}$$

In equation (8), N indicates a total quantity of graphics elements (e.g., Gaussian elements) along the camera ray associated with the pixel at coordinates [m,n]. The term $c_{s[k]}[m,n]$ indicates a color vector for a distance-sorted graphics element having index value k in a sorting order of the graphics elements. In an example where the graphics element is a Gaussian element $c_{s[k]}[m,n]$ may be a view-dependent color vector for the Gaussian element. The term $\alpha_{s[k]}[m,n]$ indicates an opacity value for the distance-sorted graphics element having an index value k in the sorting order. Similarly, $\alpha_{s[l]}[m,n]$ indicates an opacity value for the distance-sorted graphics element having an index value l in the sorting order. Note that in equation (8), the term $$\prod_{l=1}^{k-1} (1 - \alpha_{s[l]}[m, n])$$

is calculated individually for each of index values k=1 to N so that the scaled color vector for the graphics element with index value k ($c_{s[k]}[m,n]\ \alpha_{s[k]}[m,n]$) is further scaled based on the opacity values of graphics elements closer to the camera position than the graphics element with index value k. Thus, a renderer using equation (8) needs to sort the graphics elements based on depth from the camera position.

Representing a scene in terms of parameters of Gaussian elements is typically not convenient for human designers because the parameters are not intuitive and because it is difficult to manually create objects by setting up elements with fuzzy boundaries. On the other hand, the smooth transitions of color and opacity inherent in Gaussian elements may enable efficient methods to compute derivatives of rendering errors, and thus prove to be a good choice for a scene representation in the scheme of FIG. 3.

In complex scenes, like those used in computer games, most of the graphics elements are assumed to be opaque (i.e., $\alpha_i \equiv 1$ in the object's surface), so equation (8) can be implemented in a massively parallel manner by simply storing, for each pixel, the minimum depth of the elements already rendered, and only updating the color vector of a pixel if the newly visited element has smaller depth (Z-buffer updates). This is what enables current graphics processing units (GPUs) to render complex scenes at high resolutions and frame rates. On the other hand, when there is transparency, equation (8) defines a strictly sequential order for processing elements, and the only way to parallelize rendering is to create sets of non-overlapping elements and implement sequential alpha-blending on each set.

This made introduction of transparency in games challenging, but transparency is needed to represent many essential elements, like flames and smoke, clouds, "force fields," and so on. One proposed empiric solution to avoid sorting, named Order-Independent Transparency (OIT), is to approximate equation (8) with a weighted sum. There are several OIT variants. The most general, which is related to the techniques of this disclosure, is to replace equation (8) with the following equation for determining a rendered color vector $\hat{r}$ for a pixel at coordinates [m,n] of a rendered image:

$$\hat{r}[m, n] = \overline{\alpha}[m, n] c_0[m, n] + (1 - \overline{\alpha}[m, n]) \frac{\sum_{i=1}^{N} c_i[m, n]\, \alpha_i[m, n]\, w(z_i, \alpha_i[m, n])}{\sum_{i=1}^{N} \alpha_i[m, n]\, w(z_i, \alpha_i[m, n])}, \tag{9}$$

where $z_i$ is the distance to a virtual camera, $c_0[m,n]$ is the background color for the pixel at position [m,n] in the rendered image, and $w(z,\alpha)$ is a function that decreases with distance, so that objects nearer to the camera are assigned larger weights in the alpha-normalized weighted sum of equation (9). The renderer may calculate the term $\overline{\alpha}[m,n]$ using the following equation:

$$\overline{\alpha}[m, n] = \prod_{i=1}^{N} (1 - \alpha_i[m, n]), \tag{10}$$

Note that equation (9) is a weighted sum of a first value and a second value, where the first value is the background color vector $c_0$ for the camera ray associated with pixel [m,n] scaled by the accumulated opacity ($\overline{\alpha}[m,n]$) of the camera ray, and the second term is a composited color vector scaled by the accumulated transparency $(1-\overline{\alpha}[m,n])$ of the camera ray. In the OIT rendering of equation (9), there are two summation operations $$\sum_{i=1}^{N} \cdots$$

for determining a color vector for a pixel, and since addition is communicative, the terms in the summation operations can be computed in any order. However, the final color vector for a pixel can only be computed after the two sums are known, which can be done with a single pass over all pixels, performing the divisions in equation (9). In other words, the renderer can perform the summation operations for all pixels, and then, after the summation operations for all pixels are complete, perform the division operations for all pixels. Since OIT uses the term $w(z,\alpha)$ instead of the actual opacity values of closer graphics elements, OIT may eliminate the need for sorting the graphics elements based on depth during rendering. However, use of the term $w(z,\alpha)$ instead of the actual opacity values of closer graphics elements means that OIT only provides an approximation of alpha blending and does not model truly opaque surfaces.

Because OIT allows rendering transparency without sorting, OIT may be considered for eliminating the computationally expensive sorting phase of Gaussian splatting rendering. However, while OIT methods have been extensively used in computer games for several years, the OIT methods were developed to be used with conventional computer graphics, and only meant to represent semi-transparent elements. Furthermore, the OIT methods are not expected to generate good approximations since the OIT methods are used with elements of shape and appearance where differences are difficult to see, like flames and smoke. Finally, human intervention may be needed to identify when the OIT methods are not working correctly, and to fix problems.

With 3D Gaussian splatting, all Gaussian elements have transparency, but the Gaussian elements should also represent opaque surfaces, which may in fact be the only type of surfaces needed in a scene. Opaque surfaces can be achieved with many small Gaussian elements that are tightly packed, so that the transparent regions overlap, and create the appearance of solid objects. Thus, it can be concluded that the current OIT implementations cannot be directly applied to 3DGS because OIT was designed for a different type of rendering, providing only rough approximations to alpha blending, and not designed to model opaque surfaces whereas Gaussian elements can model opaque surfaces. Additionally, conventional 3D Gaussian splatting techniques and parameters have been optimized for rendering with equation (8), which represents an approximation of physical processes (light absorption in translucent media) but requires sorting of Gaussian elements based on depth, while equation (9) is not truly a rendering equation but only an empiric approximation.

Figure 5:
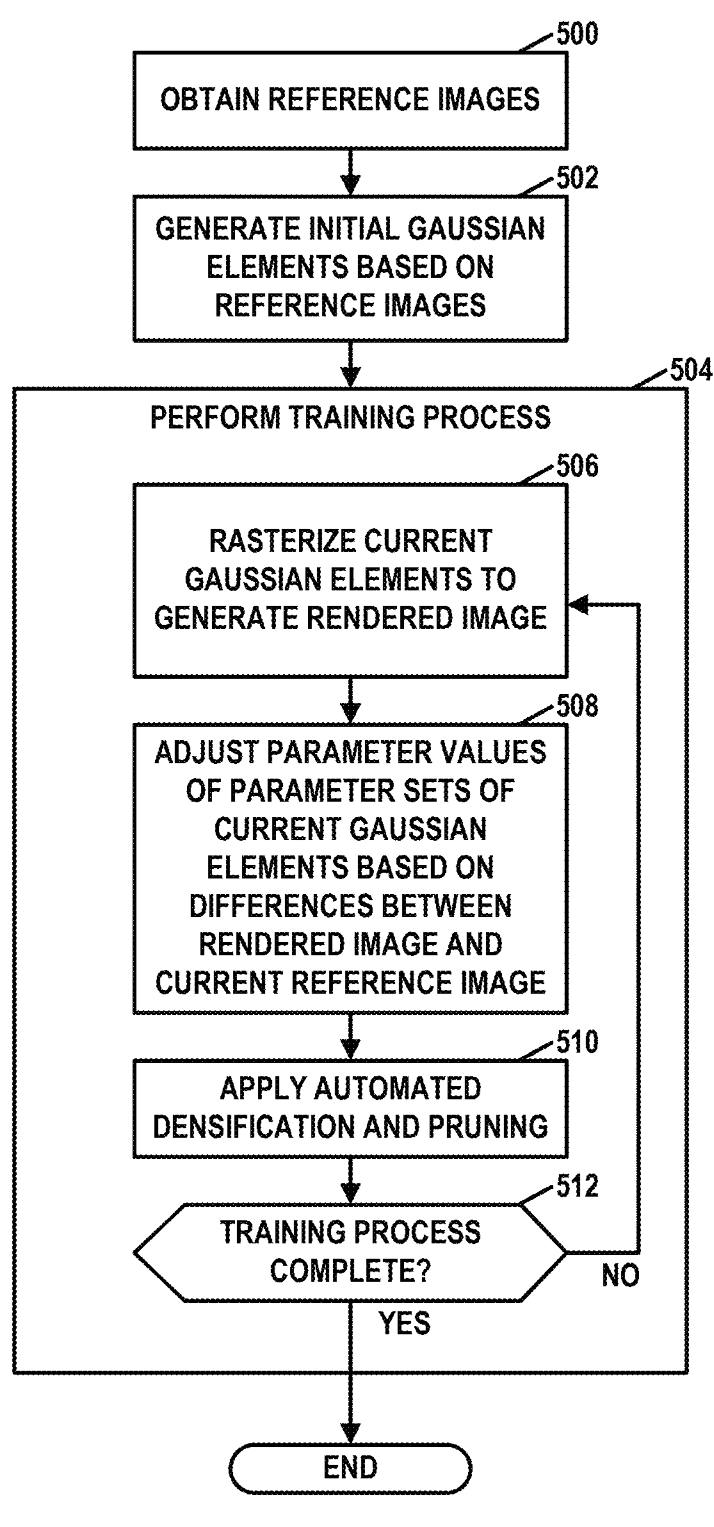
FIG. 5 is a flowchart illustrating an example Gaussian splatting with weighted sum rendering (GS-WSR) process, in accordance with one or more techniques of this disclosure.

The techniques of this disclosure may solve these problems and enable 3D Gaussian splatting rendering without a sorting pass. Specifically, this disclosure introduces a technique referred to herein as Gaussian splatting with weighted sum rendering (GS-WSR). FIG. 5 a flowchart illustrating an example GS-WSR process, in accordance with one or more techniques of this disclosure. In the example of FIG. 5, renderer 120 obtains one or more references images (500). The reference images may represent a single, shared 3D scene from multiple viewpoints (e.g., camera positions). The 3D scene may be a virtual scene, such as a scene generated by a video game, and the reference images may be previously rendered images of the virtual scene. In some examples, the 3D scene is a real-world scene and the reference images may be captured by image sources 104 (FIG. 1), such as cameras. Renderer 120 may obtain the one or more reference images from a storage system (e.g., storage system 112).

In some examples, the one or more reference images are images that renderer 120 has previously rendered. For instance, processors 114 may execute application 116 to generate geometry data, geometry processing system 118 may perform a geometry processing step of a graphics pipeline in order to generate a set of primitives based on the geometry data, and renderer 120 may perform a rasterizing step of the graphics pipeline in order to generate the one or more reference images based on the set of primitives.

Renderer 120 may generate a plurality of initial Gaussian elements based on the one or more reference images (502). For example, renderer 120 may generate a point cloud based on the one or more reference images. A point cloud is a collection of points. The points in the point cloud may correspond to points on surfaces of objects in a scene. Each point indicates a single location in an n-dimensional space, such as a three-dimensional space. For instance, in a Cartesian coordinate system a point may be specified by an x-coordinate, a y-coordinate, and a z-coordinate. In a spherical coordinate system, a point may be specified by an azimuth coordinate, an elevation coordinate, and a distance coordinate. In some examples, such as examples where image sources 104 include depth cameras, renderer 120 may use depth images along with image data from image cameras to generate the point cloud. In some examples, the points in the point cloud have color attributes based on colors of pixels in the reference images. Renderer 120 may then convert each point in the point cloud or a subset of the points in the point cloud into respective Gaussian elements in the set of initial Gaussian elements. In some examples, renderer 120 may generate individual Gaussian elements based on multiple points. The maximum opacity, spatial orientation, scale vectors, and color vectors of the initial Gaussian elements may initially have default values. In some examples, renderer 120 may set the color vectors of the initial Gaussian elements based on color attributes of the corresponding points in the point cloud.

Figure 6:
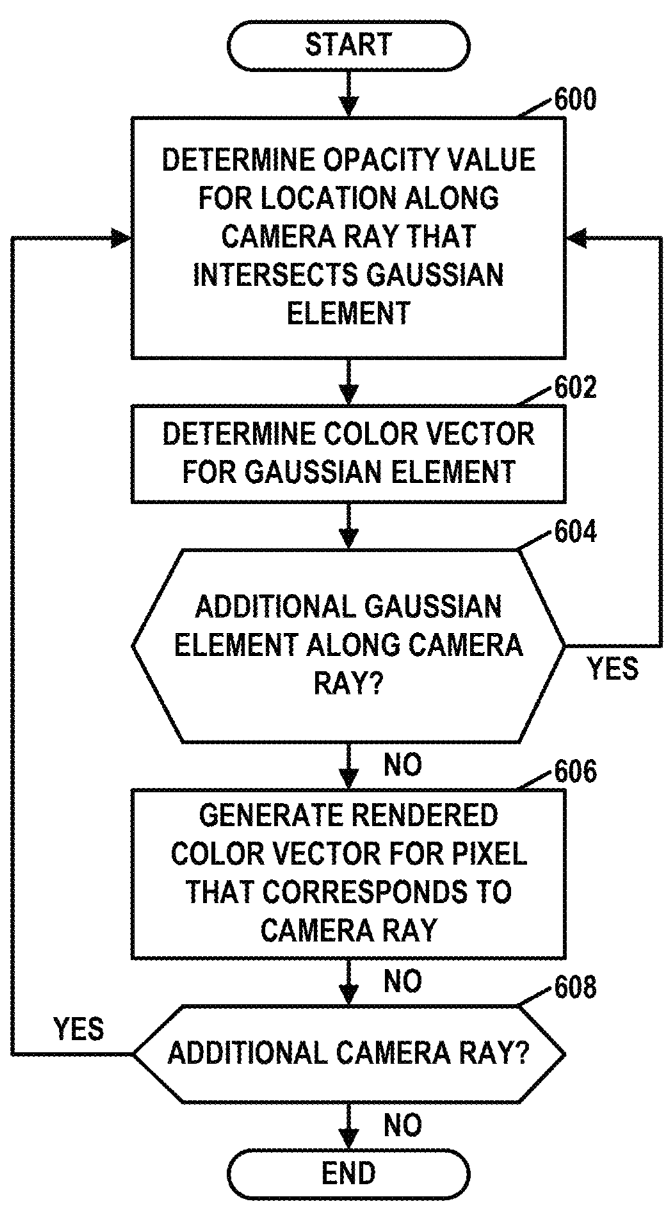
FIG. 6 is a flowchart illustrating an example process for rasterizing Gaussian elements to generate a rendered image, in accordance with one or more techniques of this disclosure.

After generating the initial Gaussian elements, renderer 120 may perform one or more iterations of a training process (504). In each iteration of the training process, renderer 120 may rasterize a set of current Gaussian elements for the iteration to generate a rendered image of the scene as viewable from a current camera position for the iteration (506). During at least an initial iteration of the one or more iterations, the current Gaussian elements are the initial Gaussian elements. The current camera position of the iteration is the camera position associated with a current reference image for the iteration. The rendered image is a 2D image. FIG. 6, which is described in greater detail below, describes an example operation for rasterizing the Gaussian elements to generate the rendered image.

After generating the rendered image, renderer 120 may adjust the parameter values of the parameter sets of the current Gaussian elements based on differences between the rendered image and the current reference image (508). For instance, renderer 120 may use a loss function calculate a loss value that represents the differences between the rendered image and the current reference image. Renderer 120 may compute a partial gradient of the loss function with respect to each of the parameters of each of the Gaussian elements. Renderer 120 may then use the partial gradients to adjust the parameter values using a gradient descent process. Renderer 120 may calculate the loss value and adjust the parameter values in one of variety of ways. An example process for calculating the loss value and adjusting the parameter values is described in detail elsewhere in this disclosure.

Furthermore, as shown in the example of FIG. 5, renderer 120 may apply an automated densification and pruning process that may increase or decrease the quantity of the current Gaussian elements (510). For example, renderer 120 may determine positional gradients of the Gaussian elements based on the adjusted parameter values of the Gaussian element. In other words, renderer 120 may determine a differentiable function over the center points of the Gaussian elements in a Euclidean space having x, y, and z dimensions. The positional gradients of a Gaussian element are the gradients of this function in the x, y, and z dimensions at the center point of the Gaussian element. If the positional gradient of the Gaussian element is below a first threshold, renderer 120 may clone the Gaussian element, meaning that renderer 120 generates a copy of the Gaussian element and moves a center position of the newly generated Gaussian element by an amount along a direction of the opacity gradient. If the opacity gradient of the Gaussian element is greater than a second threshold, renderer 120 may split the Gaussian element into two Gaussian elements. If the maximum opacity value of a Gaussian element is below a third threshold, renderer 120 may remove the Gaussian element. In some examples, renderer 120 does not apply the automated densification and pruning process in each iteration of the training process. Thus, the current Gaussian elements may be different in different iterations of the training process. In some examples, renderer 120 does not apply the automated densification and pruning process at all.

Renderer 120 may then determine whether the training process is complete (512). If the training process is not complete ("NO" branch of 512), renderer 120 may perform a next iteration of the training process. The current Gaussian elements of the next iteration may be the densified and pruned Gaussian elements determined in step 510. The current reference image of the next iteration may be the same reference image or a different reference image as the previous iteration. Otherwise, if the training process is complete ("YES" branch of 512), the training process may end. The training process may be complete after a set of one or more completion criteria have been met, such as a predetermined number of iterations, a sufficient level of reconstruction accuracy, and/or other criteria. The rendered image generated by the process of FIG. 5 is a rendered image generated by rasterizing final Gaussian elements, where the final Gaussian elements are the current Gaussian elements of a final iteration of the one or more iterations of the training process. After the training process is complete, renderer 120 may generate a rendered image by rasterizing the final Gaussian elements to generate a rendered image of the scene as viewable from a virtual camera position different from the camera positions associated with any of the one or more reference images.

FIG. 6 is a flowchart illustrating an example process for rasterizing Gaussian elements to generate a rendered image, in accordance with one or more techniques of this disclosure. In the example of FIG. 6, renderer 120 may determine an opacity value for a location along a camera ray that intersects a Gaussian element of the current Gaussian elements (600). Renderer 120 may determine the opacity value for the location based on the position vector of the Gaussian element, the orientation vector of the Gaussian element, the scale vector of the Gaussian element, and a view-dependent scaling value, wherein the view-dependent scaling value depends on the current camera position, the position vector of the Gaussian element, and the learnable parameter vector.

In accordance with a technique of this disclosure, equations (1) and (3), which define the shapes, colors, and opacity values of Gaussian elements, are modified so that maximum opacity parameter $t_i \in [0,1]$ is replaced with an unconstrained view-dependent scaling value $u_i(f-p_i,t_i)$. In accordance with a technique of this disclosure, renderer 120 may determine an opacity value for a location x along a camera ray traversing a camera position f that intersects a Gaussian element i using the following equation:

$$\alpha_i(x, t_i) = u_i(f - p_i, t_i)\exp\left(-\frac{(x-p_i)^t\left[\sum(q_i, s_i)\right]^{-1}(x-p_i)}{2}\right), \quad i = 1, 2, \ldots, N, \tag{11}$$

The view-dependent scaling value $u_i(f-p_i,t_i)$ for Gaussian element i, abbreviated as $u_i$, depends on the viewing direction (f−p) and a learnable parameter vector $t_i$ for Gaussian element i. The learnable parameter vector $t_i$ may include spherical harmonics coefficients. The learnable parameter vector $t_i$ for Gaussian element i is distinct from the SH coefficient array $H_i$ for the Gaussian element i. Renderer 120 may calculate the view-dependent scaling value $u_i$ in a similar (or same) way as described above with respect to calculating color values in the color vector c for the Gaussian element. Note that spherical harmonics are used here as an example, and in general spherical harmonics can be replaced with any method to parameterize functions on a 3D sphere.

With continued reference to FIG. 6, renderer 120 may additionally determine a color vector $c(f-p_i,H_i)$ for the Gaussian element (602). Renderer 120 may calculate c as described above. Renderer 120 may determine the color vector for the Gaussian element before, after, or parallel with determining the opacity value of the a location x along a camera ray traversing the camera position f that intersects the Gaussian element. Given that the opacity value of equation (11) now depends on the camera position f, the equation for determining an alpha-scaled color vector $r_i$ for an individual location x may be written as follows:

$$r_i(x, f) = \alpha_i(x, t_i)\, c(f - p_i, H_i),\ i = 1, 2, \ldots, N. \tag{12}$$

The original 3D Gaussian splatting method uses up to 16 spherical harmonics coefficients per 3-dimensional color vector component, with a total of 48 parameters. The addition of view-dependent opacity helps improve results obtained with GS-WSR, but at the cost of adding 16 more spherical harmonics coefficients (i.e., $t_i$) to each color vector component, totaling 64 parameters. To reduce the number of spherical harmonics coefficients, the techniques of this disclosure can exploit the fact that the most common form of view-dependent color variations is defined by specular reflections, which can be approximated with a single color, but with varying intensity. This single color and its intensity can be obtained with a function x(f−p,h) that depends on view direction and spherical harmonics coefficients (up to 16 if using the same set of spherical harmonics coefficients as 3D Gaussian splatting). For example, renderer 120 may obtain the color and its intensity using in equation (12) use the following definition for the color vector $$c(f-p, H) = a + x(f-p, h)\,b, \tag{13}$$

where a and b are additional 3-dimension vectors of learnable parameters. The vector a represents a base color, e.g., in terms of a R, G, and B value. The vector b represents a direction of change of color. In equation (13), x is a function of f−p and h that produces a scalar value. The scalar function x may be similar to the spherical harmonics coefficients of equations (1), (2), and (3), but uses a single 16-dimensional vector h instead of the 3×16 matrix H. Thus, x may be represented as $x=h^TY$. The 16-dimensional vector h may include learned parameters.

If there are additional Gaussian elements along the camera ray ("YES" branch of 604), renderer 120 may determine an opacity value and color vector for the additional Gaussian elements. In some examples, renderer 120 may process multiple Gaussian elements along the camera ray in parallel to determine opacity values and color vectors of the Gaussian elements.

If there are no additional Gaussian elements along the camera ray ("NO" branch of 604), renderer 120 may generate a rendered color vector for the pixel associated with the camera ray (606). With the new formulation for color and opacity, described in equation (11), after employing the same discretization used for the original 3D Gaussian splatting method, renderer 120 may determine a rendered color vector r for a pixel at image coordinates [m,n] according to equation (14), below:

$$r[m, n] = \overline{\alpha}[m, n]c_0[m, n] + (1-\overline{\alpha}[m, n])\frac{\sum_{i=1}^{N} c_i[m, n]\,\alpha_i[m, n]\,W(z_i; w_i)}{\sum_{i=1}^{N} \alpha_i[m, n]\,W(z_i; w_i)}, \tag{14}$$

In equation (14), the term $W(z_i;w_i)$ is a depth term for Gaussian element i. Renderer 120 may calculate the depth term for Gaussian element i based on a depth $z_i$ of Gaussian element i and a learnable weight vector $w_i$ of Gaussian element i. The learnable weight vector $w_i$ of Gaussian element i includes one or more learnable weight values. The learnable parameters of the learnable weight vector may be learned in the training process.

In different examples, the depth term may be determined in one of a variety of ways. For instance, in some examples, the depth term (i.e., $W(z_i;w_i)$) may be defined as follows:

$$W(z_i; \sigma_i; v_i) = v_i \max\left(0, 1 - \frac{z_i}{\sigma_i}\right) \tag{15}$$

In equation (15), $v_i$ and $\sigma_i$ are learnable parameters in the learnable weight vector $w_i$ of Gaussian element i. In another example, the depth term may be defined as follows:

$$W(z_i; \tau_i, \omega_i) = e^{\tau_i |z_i|^{\omega_i}} \tag{16}$$

In equation (16), $\tau_i$ and $\omega_i$ are learnable parameters in the learnable weight vector $w_i$ of Gaussian element i. Thus, with respect to equation (16), equation (14) may be rewritten as:

$$r[m, n] = \overline{\alpha}[m, n]c_0[m, n] + (1-\overline{\alpha}[m, n])\frac{\sum_{i=1}^{N} c_i[m, n]\,\alpha_i[m, n]\,e^{-d(z_i, w_i)}}{\sum_{i=1}^{N} \alpha_i[m, n]\,e^{-d(z_i, w_i)}} \tag{17}$$

where $$d(z_i, w) = w_o |z_i|^{w_1}. \tag{18}$$

In equation (18), $w_0$ and $w_1$ are learnable parameters in the learnable weight vector $w_i$ of Gaussian element i. Thus, $d(z_i,w)$ is a positive function that depends on the depth $z_i$ of Gaussian element i and a vector w of learnable weight values for the Gaussian element i.

In equations (14) and (17), $c_0[m,n]$ is the background color vector for the camera ray associated with the pixel at image coordinates [m,n], $c_i[m,n]$ is the view-dependent color vector for Gaussian element i (i.e., $c(f-p_i,H_i)$), and $\alpha_i[m,n]$ is the opacity value for Gaussian element i at a location x along the camera ray that intersects Gaussian element i.

Thus, with respect to equations (16)-(18), as part of generating a rendered color vector for a pixel, renderer 120 may, for each Gaussian element of the current Gaussian elements that intersects the camera ray, calculate a depth term d for the Gaussian element based on a depth $z_i$ of the Gaussian element and the learnable weight vector w for the Gaussian element. In other words, renderer 120 may calculate the depth term for the Gaussian element as $e^{-d(z_i,w)}$, where e is Euler's number, $z_i$ is the depth of the Gaussian element, w is the learnable weight vector for the Gaussian element, and d is a function based on the depth of the Gaussian element the learnable weight vector for the Gaussian element. The function based on the depth of the Gaussian element the learnable weight vector for the Gaussian element is defined as $d(z_i,w)=w_o|z_i|^{w_1}$, where $w_0$ and $w_i$ are weights in the learnable weight vector for the Gaussian element.

Renderer 120 may generate the rendered color vector for the pixel based on the opacity values α for the current Gaussian elements that intersect the camera ray, the view-dependent color vectors c for the current Gaussian elements that intersect the camera ray, and the depth terms d for the current Gaussian elements that intersect the camera ray. Rendering with equation (14) corresponds to only computing weighted sums, visiting the Gaussian elements in any order. For that reason, it is called Gaussian splatting with weighted sum rendering (GS-WSR).

This GS-WSR formulation is similar to OIT in equation (9) and requires computing values of $\overline{\alpha}[m,n]$ for each pixel. This requirement can be eliminated by using a simplified version of GS-WSR, where renderer 120 learns a depth for a scene background and renderer 120 computes pixels values using the following formula:

$$r[m, n] = \frac{\sum_{i=0}^{N} c_i[m, n]\,\alpha_i[m, n]\,e^{-d(z_i, w_i)}}{\sum_{i=0}^{N} \alpha_i[m, n]\,e^{-d(z_i, w_i)}}, \tag{19}$$

where $\alpha_0[m,n]=1$, and $z_0$ is the learned background depth.

Thus, with respect to equation (19), renderer 120 may calculate a numerator value as a sum of first terms for the current Gaussian elements that intersect the camera ray. Renderer 120 may calculate the numerator value by calculating, for each of the current Gaussian elements that intersects the camera ray, a first term ($c_i[m,n]\alpha_i[m,n]\ e^{-d(z_i,w_i)}$) for the current Gaussian element based on a multiplication of a value of a color component in the view-dependent color vector ($c_i[m,n]$) for the current Gaussian element by the opacity value ($\alpha_i[m,n]$) for the current Gaussian element and an exponential function of the depth term ($d(z_i,w_i)$) for the current Gaussian element. Renderer 120 may calculate a denominator value as a sum of second terms ($\alpha_i[m,n]\ e^{-d(z_i,w)}$) for the current Gaussian elements that intersect the camera ray. Renderer 120 may calculate the denominator value by calculating, for each of the current Gaussian elements that intersects the camera ray, a second term for the current Gaussian element based on a multiplication of the opacity value for the current Gaussian element and the exponential function of the depth term for the current Gaussian element. Renderer 120 may calculate a value of the color component in the rendered color vector for the pixel based on a division of the numerator value by the denominator value.

While 3DGS can be considered a conventional graphics technique that is augmented with machine learning tools, the formulation of this disclosure departs from physics-based assumptions, and instead relies more on the machine learning to work. For instance, alpha blending is based on the physical principles of light transmittance and absorption. Thus, in equation (8) it is necessary to have $\alpha_i \in [0,1]$ to guarantee that all terms are positive. However, those requirements are not required for equations (14), (17), and (19) because, in the machine learning framework, $\alpha_i$ are simply parameters in a radiance field model, and thus removing constraints can potentially result in better approximations. Similarly, the view-dependent scaling value $u_i\ (f-p_i,t_i)$ used in equation (11) may not correspond to optical laws, but it is, in practice, useful for minimizing the limitations of rendering equation (9) compared to blending in equation (8).

With continuing reference to FIG. 6, if there are additional camera rays to process ("YES" branch of 608), renderer 120 may repeat steps 600 through 608 for an additional camera ray. In this way, by determining rendered color vectors for each of the pixels corresponding to the camera rays, renderer 120 may generate the rendered image. In some examples, renderer 120 processes multiple camera rays in parallel.

As discussed above with respect to FIG. 5, renderer 120 may adjust parameter values of parameters of current Gaussian elements based on differences between the rendered image and the current reference image. In accordance with the techniques of this disclosure, renderer 120 may adjust the parameter values of the learnable parameter vector t used in the view-dependent scaling values u (in place of adjusting the value of the maximum opacity value parameter $t_i$) and may adjust values of w.

As described above, equations (16) and (17) use exponential functions (i.e., $e^{-d(z_i,w_i)}$ for computing color vector weights (e.g., $e^{-d(z_i,w_i)}$) because they simplify updating weighted sums in a manner that avoids losing precision with weight numerical underflow. The sums can be efficiently computed such that the weights are normalized by the largest weight. The techniques of this disclosure exploit the fact that the quotient of weighted sums, as in equations (16) and (17), are not affected by adding constants to the exponent. For example, assuming there are two functions such that $\tilde{d}(z, w_i)=d(z,w_i)+\xi$, and use them in a quotient of weighted sums. This results in each of the following are the same:

$$\frac{\sum_{i=0}^{N} a_i e^{-\tilde{d}(z_i,w_i)}}{\sum_{i=0}^{N} b_i e^{-\tilde{d}(z_i,w_i)}} = \frac{e^{-\xi}\sum_{i=0}^{N} a_i e^{-d(z_i,w_i)}}{e^{-\xi}\sum_{i=0}^{N} b_i e^{-d(z_i,w_i)}} = \frac{\sum_{i=0}^{N} a_i e^{-d(z_i,w_i)}}{\sum_{i=0}^{N} b_i e^{-d(z_i,w_i)}}, \tag{20}$$

In equation (20), $a_i$ can be replaced by $c_i[m,n]\ \alpha_i[m,n]$ and $b_i$ can be replaced by $\alpha_i[m,n]$.

This property can be used while updating the weighted sums in equation (17). Defining $$\mu_k = \min_{i=0,1,\ldots,k} d(z_i, w_i),\ k = 0, 1, \ldots, N, \tag{21}$$

and $$\sigma_k(k) = e^{\mu_k} \sum_{i=0}^{k} c_i e^{-d(z_i,w_i)},\ k = 0, 1, \ldots, N, \tag{22}$$

leads to $$\sigma_k(c) = e^{\mu_k - d(z_k,w_i)} c_k + e^{\mu_k - \mu_{k-1}} \sigma_{k-1}(c). \tag{23}$$

where the term $c_i$ corresponds to $c_i[m,n]\ \alpha_i[m,n]$ or $c_i[m,n]\ \alpha_i[m,n]$ in equation (17).

This means that $\mu_k$, $\sigma_k$ can be updated from $\mu_{k-1}$, $\sigma_{k-1}$ as $$\mu_k = \min(d(z_i, w_i), \mu_{k-1}), \tag{24}$$

$$\sigma_k(c) = \begin{cases} c_k + e^{d(z_k,w_i)-\mu_{k-1}} \sigma_{k-1}(c), & d(z_k, w_i) < \mu_{k-1}, \\ e^{\mu_{k-1}-d(z_k,w_i)} c_k + \sigma_{k-1}(c), & \text{otherwise} \end{cases}, \tag{25}$$

and the final result can be obtained from the quotient of sums with normalized weights:

$$\frac{\sum_{i=0}^{N} a_i e^{-d(z_i,w_i)}}{\sum_{i=0}^{N} b_i e^{-d(z_i,w_i)}} = \frac{e^{-\mu_N}\sum_{i=0}^{N} a_i e^{-d(z_i,w_i)}}{e^{-\mu_N}\sum_{i=0}^{N} b_i e^{-d(z_i,w_i)}} = \frac{\sigma_N(a)}{\sigma_N(b)}. \tag{26}$$

Similar to other machine learning problems, renderer 120 may determine the GS-WSR parameters by minimizing a loss function over a training set. In this case, the training set is defined by a set of reference images as shown in FIG. 3. Using Ry and Sy to represent respectively the rendered images (i.e., rendered views, rendered images) and the training set images, with pixel values $r_v[m,n]$ and $s_v[m,n]$, the average loss for a given error function D may be specified by:

$$L = \frac{1}{VHW} \sum_{v=1}^{V} \sum_{m=1}^{H} \sum_{n=1}^{W} D(r_v[m, n], s_v[m, n]). \tag{27}$$

where L is a loss value, V indicates the quantity of rendered images and training set images (i.e., reference images), H indicates the quantity of rows of pixels in the rendered images and the reference images, and W indicates the quantity of columns of pixels in the rendered images and the reference images. $r_v$ indicates pixels of the rendered image v, $s_v$ indicates pixels of the current reference image corresponding to the rendered image v, and D indicates a difference between corresponding pixels of the rendered image v and the current reference image. In some examples, the error function D may simply calculate the difference between $r_v[m,n]$ and $s_v[m,n]$.

During optimization (i.e., training), renderer 120 may compute partial derivatives of L with respect to all model parameters. Using $\mathcal{P}_i$ to represent the set with all parameters of the Gaussian element with index i, renderer 120 may compute:

$$\frac{\partial L}{\partial \tau_i}, \text{ for all } \tau_i \in \mathcal{P}_i. \tag{28}$$

To simplify notation, it is assumed that the loss function in equation (27) is fully separable per pixel, the image and pixel indexes are dropped to represent a pixel color vector r, and also $d(z_i,w)$ is replaced with $d_i$ to define a single pixel color vector as:

$$r = \frac{\sum_{i=0}^{N} c_i \alpha_i e^{-d_i}}{\sum_{i=0}^{N} \alpha_i e^{-d_i}}, \tag{29}$$

where it is implicitly assumed that $c_i, \alpha_i, d_i$ may depend on a parameter represented simply as $\tau_i$. With this notation, renderer 120 may compute the partial derivatives as:

$$\frac{\partial D(r,s)}{\partial \tau_i} = \sum_{l=1}^{3} \frac{dD(r_l, s_l)}{dr_l} \frac{\partial r_l}{\partial \tau_i}, \text{ for all } \tau_i \in \mathcal{P}_i, \tag{30}$$

where l is an index of the color component, and $$r_l = \frac{\sum_{i=0}^{N} c_{i,l} \alpha_i e^{-d_i}}{\sum_{i=0}^{N} \alpha_i e^{-d_i}}, \tag{31}$$

This corresponds to $$\frac{\partial D(r,s)}{\partial \tau_i} = \frac{1}{\sum_{i=0}^{N} \alpha_i e^{-d_i}} \sum_{l=1}^{3} \frac{dD(r_l,s_l)}{dr_l} \left( \left( \alpha_i e^{-d_i} \frac{\partial c_{i,l}}{\partial \tau_i} + (c_{i,l} - r_l) \frac{\partial (\alpha_i e^{-d_i})}{\partial \tau_i} \right) \right). \tag{32}$$

Since equation (29) is a fraction of two summations, the parameter partial derivatives depend on the final summation values. Renderer 120 may compute those per-pixel values with a single, first rendering pass, and in a second pass, renderer 120 may compute the full gradient using equation (32). In other words, renderer 120 computes the color vectors for the pixels in the rendered image before computing the full gradient. The important observation is that GS-WSR can also be more efficient during the optimization stage because no sorting is needed in either gradient determination pass, and thus all the computations can all be done independently for each GS-WSR element (i.e., in parallel). Thus, renderer 120 may compute the color vectors for the pixels in the rendered image are computed in a first rendering pass, and may adjust the parameter values of the parameter sets of the current Gaussian elements comprises computing gradients of the loss function in a second pass.

Figure 7:
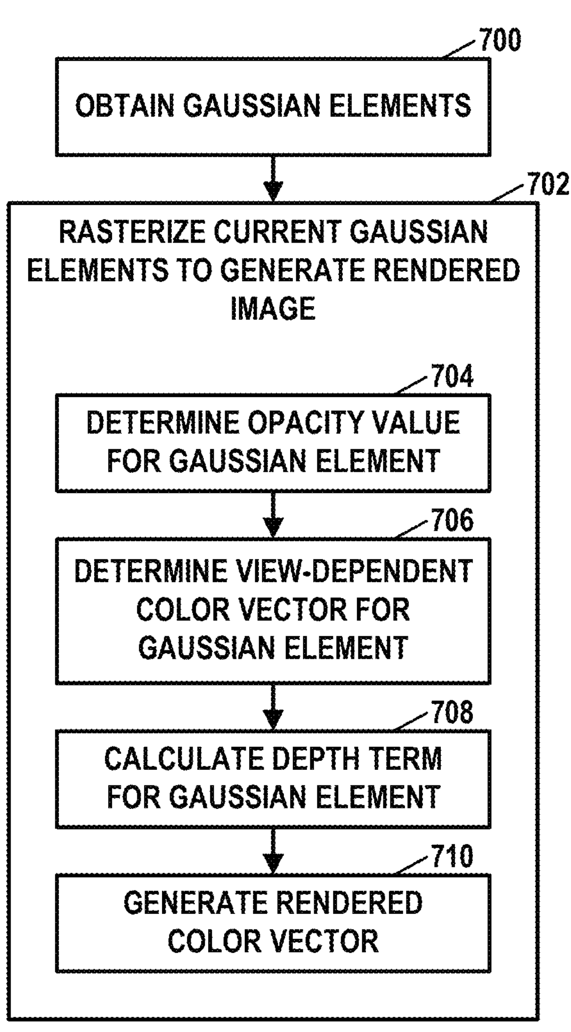
FIG. 7 is a flowchart illustrating an example process GS-WSR process, in accordance with one or more techniques of this disclosure.

FIG. 7 is a flowchart illustrating an example process GS-WSR process, in accordance with one or more techniques of this disclosure. In the example of FIG. 7, renderer 120 may obtain a plurality of Gaussian elements (700). For each Gaussian element of the plurality of Gaussian elements, the Gaussian element is defined by parameter values of a parameter set for the Gaussian element, the parameter set including a learnable parameter vector of the Gaussian element, a learnable weight vector of the Gaussian element, and a spherical harmonics (SH) coefficient array of the Gaussian element, the SH coefficient array of the Gaussian element being an array of 3D color vectors corresponding to SH coefficients.

Renderer 120 may obtain the Gaussian elements in one of a variety of ways. For example, renderer 120 may obtain reference images and perform a training process, e.g., as described above with respect to FIG. 5, to obtain the Gaussian elements. In some examples, renderer 120 may obtain the Gaussian elements from an external source, such as a computer-readable storage medium or another computing system.

After obtaining the Gaussian elements, renderer 120 may rasterize the Gaussian elements to generate a rendered image of a scene as viewable from a camera position (702). Renderer 120 may rasterize the Gaussian elements in accordance with the method described above with respect to FIG. 6. That is, for at least one camera ray extending from the camera position, renderer 120 may determine an opacity value for a location based on a view-dependent scaling value that depends on the camera position and a learnable parameter vector of a Gaussian element of the plurality of Gaussian elements that intersects the camera ray (704). Renderer 120 may determine a view-dependent color vector for the Gaussian element based on the camera position, a position vector of the Gaussian element, and the SH coefficient array of the Gaussian element (706). Renderer 120 may calculate a depth term for the Gaussian element based on a depth of the Gaussian element and the learnable weight vector for the Gaussian element (708). For instance, renderer 120 may calculate the depth term as $e^{-d(z_i,w_i)}$, in accordance with equations (15) or (16), or in another way. Renderer 120 may generate a rendered color vector for a pixel that corresponds to the camera ray based on the opacity value for the Gaussian element, the view-dependent color vector for the Gaussian element, and the depth term for the Gaussian element (710). For instance, renderer 120 may calculate the rendered color value using equation (14), equation (17), or in another way.

Various examples of the techniques of this disclosure are summarized in the following clauses.

Clause 1. A method for generating a rendered image, the method comprising: obtaining, by one or more processors, a plurality of Gaussian elements, wherein, for each Gaussian element of the plurality of Gaussian elements, the Gaussian element is defined by parameter values of a parameter set for the Gaussian element, the parameter set including a learnable parameter vector of the Gaussian element, a learnable weight vector of the Gaussian element comprising one or more learnable weight values, and a spherical harmonics (SH) coefficient array of the Gaussian element, the SH coefficient array of the Gaussian element being an array of 3D color vectors corresponding to SH coefficients; and rasterizing the Gaussian elements to generate a rendered image of a scene as viewable from a camera position, wherein rasterizing the Gaussian elements comprises, for at least one camera ray extending from the camera position: determining an opacity value for a location based on a view-dependent scaling value that depends on the camera position and a learnable parameter vector of a Gaussian element of the plurality of Gaussian elements that intersects the camera ray; determining a view-dependent color vector for the Gaussian element based on the camera position, a position vector of the Gaussian element, and the SH coefficient array of the Gaussian element; calculating a depth term for the Gaussian element based on a depth of the Gaussian element and the learnable weight vector for the Gaussian element; and generating a rendered color vector for a pixel that corresponds to the camera ray based on the opacity value for the Gaussian element, the view-dependent color vector for the Gaussian element, and the depth term for the Gaussian element.

Clause 2. The method of clause 1, wherein the method further comprises: obtaining, by the one or more processors, one or more reference images of a scene, wherein each respective reference image of the one or more reference images is associated with a respective camera position from which the respective reference image is virtually or physically captured; generating, by the one or more processors, a plurality of initial Gaussian elements based on the one or more reference images; performing, by the one or more processors, one or more iterations of a training process, wherein performing each of the one or more iterations of the training process comprises: rasterizing current Gaussian elements to generate a current rendered image of the scene as viewable from a current camera position, wherein: during at least an initial iteration of the one or more iterations, the initial Gaussian elements are the current Gaussian elements, the current camera position is the camera position associated with a current reference image, and rasterizing the current Gaussian elements comprises, for each camera ray of a plurality of camera rays extending from the current camera position: for each current Gaussian element of the current Gaussian elements that intersects the camera ray: determining an opacity value for a location based on a view-dependent scaling value that depends on the current camera position and a learnable parameter vector for the current Gaussian element; determining a view-dependent color vector for the current Gaussian element based on the current camera position, a position vector of the current Gaussian element, and the SH coefficient array of the current Gaussian element; generating a rendered color vector for a pixel in the rendered image that corresponds to the camera ray, wherein generating the rendered color vector for the pixel comprises: for each current Gaussian element of the current Gaussian elements that intersects the camera ray, calculating a depth term for the current Gaussian element based on a depth of the current Gaussian element and the learnable weight vector for the current Gaussian element; and generating the rendered color vector for the pixel based on the opacity values for the current Gaussian elements that intersect the camera ray, the view-dependent color vectors for the current Gaussian elements that intersect the camera ray, and the depth terms for the current Gaussian elements that intersect the camera ray; and adjusting the parameter values of the parameter sets of the current Gaussian elements based on differences between the rendered image and the current reference image.

Clause 3. The method of clause 2, wherein adjusting the parameter values of the parameter sets of the current Gaussian elements comprises adjusting the parameter values of the parameter sets of the current Gaussian elements to minimize a loss function given by $$L = \frac{1}{VHW}\sum_{v=1}^{V}\sum_{m=1}^{H}\sum_{n=1}^{W} D(r_v[m, n], s_v[m, n])$$

where L is a loss value, V indicates a quantity of rendered images and reference images, H indicates the quantity of rows of pixels in the rendered images and the reference images, W indicates a quantity of columns of pixels in the rendered images and the reference images, $r_v$ indicates pixels of rendered image v, $s_v$ indicates pixels of a current reference image corresponding to the rendered image v, and D indicates a difference between corresponding pixels of the rendered image v and the current reference image.

Clause 4. The method of clause 3, wherein: the color vectors for the pixels in the rendered image are computed in a first rendering pass, and adjusting the parameter values of the parameter sets of the current Gaussian elements comprises computing gradients of the loss function in a second pass.

Clause 5. The method of any of clauses 2-4, wherein the camera position is different from camera positions associated with any of the one or more reference images.

Clause 6. The method of any of clauses 1-5, wherein calculating the depth term for the Gaussian element comprises: calculating the depth term for the Gaussian element as $e^{-d(z_i,w)}$, where e is Euler's number, $z_i$ is the depth of the Gaussian element, w is the learnable weight vector for the Gaussian element, and d is a function based on the depth of the Gaussian element the learnable weight vector for the Gaussian element.

Clause 7. The method of clause 6, wherein the function based on the depth of the Gaussian element the learnable weight vector for the Gaussian element is defined as $d(z_i, w)=w_o|z_i|^{w_1}$, where $w_0$ and $w_1$ are weights in the learnable weight vector for the Gaussian element.

Clause 8. The method of any of clauses 1-5, wherein calculating the depth term for the Gaussian element comprises calculating $$W(z_i; \sigma_i, v_i) = v_i \max\left(0, 1 - \frac{z_i}{\sigma_i}\right)$$

where W is the depth term, $z_i$ is the depth of the Gaussian element, $\sigma_i$ and $v_i$ are learnable values in the learnable weight vector for the Gaussian element.

Clause 9. The method of any of clauses 1-8, wherein generating the rendered color vector for the pixel based on the opacity values for the Gaussian element, the view-dependent color vectors for the Gaussian element, and the depth term for the Gaussian element comprises: calculating the rendered color vector for the pixel as:

$$r[m, n] = \overline{\alpha}[m, n]c_0[m, n] + (1 - \overline{\alpha}[m, n])\frac{\sum_{i=1}^{N} c_i[m, n]\,\alpha_i[m, n]W(z_i; w_i)}{\sum_{i=1}^{N} \alpha_i[m, n]W(z_i; w_i)},$$

where [m,n] are coordinates of the pixel, $c_0$[m,n] is a background color for the camera ray associated with the pixel, Nis a total quantity of Gaussian elements that intersect the camera ray, $c_i$[m,n] is the view-dependent color vector for a Gaussian element i of the Gaussian elements that intersect the camera ray, $\alpha_i$[m,n] is the opacity value for the Gaussian element i at a location along the camera ray that intersects the Gaussian element i, $W(z_i;w_i)$ is the depth term for the Gaussian element i, where $z_i$ is a depth of the Gaussian element i and $w_i$ is the learnable weight vector of the Gaussian element, and $$\overline{\alpha}[m, n] = \prod_{i=1}^{N}(1 - \alpha_i[m, n]).$$

Clause 10. The method of any of clauses 1-9, wherein generating the rendered color vector for the pixel comprises: calculating a numerator value as a sum of first terms for Gaussian elements that intersect the camera ray, wherein calculating the numerator value comprises, for each of the Gaussian elements that intersects the camera ray, calculating a first term for the Gaussian element based on a multiplication of a value of a color component in the view-dependent color vector for the Gaussian element by the opacity value for the Gaussian element and an exponential function of the depth term for the Gaussian element; calculating a denominator value as a sum of second terms for the Gaussian elements that intersect the camera ray, wherein calculating the denominator value comprises, for each of the Gaussian elements that intersects the camera ray, calculating a second term for the Gaussian element based on a multiplication of the opacity value for the Gaussian element and the exponential function of the depth term for the Gaussian element; and calculating a value of the color component in the rendered color vector for the pixel based on a division of the numerator value by the denominator value.

Clause 11. The method of any of clauses 1-10, wherein: the parameter set for the Gaussian element further includes a first additional learnable parameter and a second additional learnable parameter, generating the color vector for the Gaussian element comprises calculating the color vector for the Gaussian element as:

$$c(f - p, h) = a + x(f - p, h)\, b$$

where c(f−p, h) is the color vector for the Gaussian element, f is a vector for the current camera position, p is the position vector of the Gaussian element, h is the SH coefficient array of the Gaussian element, a is the first additional parameter, b is the second additional parameter, and x is a scalar factor.

Clause 12. The method of any of clauses 1-11, further comprising: executing, by the one or more processors, an application that generates geometry data; performing, by the one or more processors, a geometry processing step of a graphics pipeline in order to generate a set of primitives based on the geometry data; and performing, by the one or more processors, a rasterizing step of the graphics pipeline in order to generate the one or more reference images based on the set of primitives.

Clause 13. A computing system comprising: one or more memories storing a plurality of Gaussian elements, wherein, for each Gaussian element of the plurality of Gaussian elements, the Gaussian element is defined by parameter values of a parameter set for the Gaussian element, the parameter set including a learnable parameter vector of the Gaussian element, a learnable weight vector of the Gaussian element comprising one or more learnable weight values, and a spherical harmonics (SH) coefficient array of the Gaussian element, the SH coefficient array of the Gaussian element being an array of 3D color vectors corresponding to SH coefficients; and one or more processors implemented in circuitry and communicatively coupled to the one or more memories, the one or more processors configured to perform operations comprising rasterizing the Gaussian elements to generate a rendered image of a scene as viewable from a camera position, wherein rasterizing the Gaussian elements comprises, for at least one camera ray extending from the camera position: determining an opacity value for a location based on a view-dependent scaling value that depends on the camera position and a learnable parameter vector of a Gaussian element of the plurality of Gaussian elements that intersects the camera ray; determining a view-dependent color vector for the Gaussian element based on the camera position, a position vector of the Gaussian element, and the SH coefficient array of the Gaussian element; calculating a depth term for the Gaussian element based on a depth of the Gaussian element and the learnable weight vector for the Gaussian element; and generating a rendered color vector for a pixel that corresponds to the camera ray based on the opacity value for the Gaussian element, the view-dependent color vector for the Gaussian element, and the depth term for the Gaussian element.

Clause 14. The computing system of clause 13, wherein the one or more processors are further configured to perform operations comprising: obtaining one or more reference images of a scene, wherein each respective reference image of the one or more reference images is associated with a respective camera position from which the respective reference image is virtually or physically captured; generating a plurality of initial Gaussian elements based on the one or more reference images; performing one or more iterations of a training process, wherein performing each of the one or more iterations of the training process comprises: rasterizing current Gaussian elements to generate a current rendered image of the scene as viewable from a current camera position, wherein: during at least an initial iteration of the one or more iterations, the initial Gaussian elements are the current Gaussian elements, the current camera position is the camera position associated with a current reference image, and rasterizing the current Gaussian elements comprises, for each camera ray of a plurality of camera rays extending from the current camera position: for each current Gaussian element of the current Gaussian elements that intersects the camera ray: determining an opacity value for a location based on a view-dependent scaling value that depends on the current camera position and a learnable parameter vector for the current Gaussian element; determining a view-dependent color vector for the current Gaussian element based on the current camera position, a position vector of the current Gaussian element, and the SH coefficient array of the current Gaussian element; generating a rendered color vector for a pixel in the rendered image that corresponds to the camera ray, wherein generating the rendered color vector for the pixel comprises: for each current Gaussian element of the current Gaussian elements that intersects the camera ray, calculating a depth term for the current Gaussian element based on a depth of the current Gaussian element and the learnable weight vector for the current Gaussian element; and generating the rendered color vector for the pixel based on the opacity values for the current Gaussian elements that intersect the camera ray, the view-dependent color vectors for the current Gaussian elements that intersect the camera ray, and the depth terms for the current Gaussian elements that intersect the camera ray; and adjusting the parameter values of the parameter sets of the current Gaussian elements based on differences between the rendered image and the current reference image.

Clause 15. The computing system of clause 14, wherein adjusting the parameter values of the parameter sets of the current Gaussian elements comprises adjusting the parameter values of the parameter sets of the current Gaussian elements to minimize a loss function given by $$L = \frac{1}{VHW}\sum_{v=1}^{V}\sum_{m=1}^{H}\sum_{n=1}^{W} D(r_v[m,n], s_v[m,n])$$

where L is a loss value, V indicates a quantity of rendered images and reference images, H indicates the quantity of rows of pixels in the rendered images and the reference images, W indicates a quantity of columns of pixels in the rendered images and the reference images, $r_v$ indicates pixels of rendered image v, $s_v$ indicates pixels of a current reference image corresponding to the rendered image v, and D indicates a difference between corresponding pixels of the rendered image v and the current reference image.

Clause 16. The computing system of clause 15, wherein: the color vectors for the pixels in the rendered image are computed in a first rendering pass, and adjusting the parameter values of the parameter sets of the current Gaussian elements comprises computing gradients of the loss function in a second pass.

Clause 17. The computing system of any of clauses 14-16, wherein the camera position is different from camera positions associated with any of the one or more reference images.

Clause 18. The computing system of any of clauses 13-17, wherein calculating the depth term for the Gaussian element comprises: calculating the depth term for the Gaussian element as $e^{-d(z_i,w)}$, where e is Euler's number, $z_i$ is the depth of the Gaussian element, w is the learnable weight vector for the Gaussian element, and d is a function based on the depth of the Gaussian element the learnable weight vector for the Gaussian element.

Clause 19. The computing system of clause 18, wherein the function based on the depth of the Gaussian element the learnable weight vector for the Gaussian element is defined as $d(z_i,w)=w_o|z_i|^{w_1}$, where $w_0$ and $w_1$ are weights in the learnable weight vector for the Gaussian element.

Clause 20. The computing system of any of clauses 13-17, wherein calculating the depth term for the Gaussian element comprises calculating $$W(z_i;\sigma_i,v_i) = v_i \max\left(0, 1-\frac{z_i}{\sigma_i}\right)$$

where W is the depth term, $z_i$ is the depth of the Gaussian element, $\sigma_i$ and $v_i$ are learnable values in the learnable weight vector for the Gaussian element.

Clause 21. The computing system of any of clauses 13-20, wherein generating the rendered color vector for the pixel based on the opacity values for the Gaussian element, the view-dependent color vectors for the Gaussian element, and the depth term for the Gaussian element comprises: calculating the rendered color vector for the pixel as:

$$r[m,n] = \overline{\alpha}[m,n]c_0[m,n] + (1-\overline{\alpha}[m,n])\frac{\sum_{i=1}^{N} c_i[m,n]\,\alpha_i[m,n]\,W(z_i;w_i)}{\sum_{i=1}^{N}\alpha_i[m,n]\,W(z_i;w_i)},$$

where [m,n] are coordinates of the pixel, $c_0[m,n]$ is a background color for the camera ray associated with the pixel, N is a total quantity of Gaussian elements that intersect the camera ray, $c_i[m,n]$ is the view-dependent color vector for a Gaussian element i of the Gaussian elements that intersect the camera ray, $\alpha_i[m,n]$ is the opacity value for the Gaussian element i at a location along the camera ray that intersects the Gaussian element i, $W(z_i;w_i)$ is the depth term for the Gaussian element i, where $z_i$ is a depth of the Gaussian element i and $w_i$ is the learnable weight vector of the Gaussian element, and $$\overline{\alpha}[m,n] = \prod_{i=1}^{N}(1-\alpha_i[m,n]).$$

Clause 22. The computing system of any of clauses 13-21, wherein generating the rendered color vector for the pixel comprises: calculating a numerator value as a sum of first terms for Gaussian elements that intersect the camera ray, wherein calculating the numerator value comprises, for each of the Gaussian elements that intersects the camera ray, calculating a first term for the Gaussian element based on a multiplication of a value of a color component in the view-dependent color vector for the Gaussian element by the opacity value for the Gaussian element and an exponential function of the depth term for the Gaussian element; calculating a denominator value as a sum of second terms for the Gaussian elements that intersect the camera ray, wherein calculating the denominator value comprises, for each of the Gaussian elements that intersects the camera ray, calculating a second term for the Gaussian element based on a multiplication of the opacity value for the Gaussian element and the exponential function of the depth term for the Gaussian element; and calculating a value of the color component in the rendered color vector for the pixel based on a division of the numerator value by the denominator value.

Clause 23. The computing system of any of clauses 13-22, wherein: the parameter set for the Gaussian element further includes a first additional learnable parameter and a second additional learnable parameter, generating the color vector for the Gaussian element comprises calculating the color vector for the Gaussian element as:

$$c(f-p,h) = a + x(f-p,h)\,b$$

where c(f−p, h) is the color vector for the Gaussian element, f is a vector for the current camera position, p is the position vector of the Gaussian element, h is the SH coefficient array of the Gaussian element, a is the first additional parameter, b is the second additional parameter, and x is a scalar factor.

Clause 24. The computing system of any of clauses 13-23, further comprising: executing, by the one or more processors, an application that generates geometry data; performing, by the one or more processors, a geometry processing step of a graphics pipeline in order to generate a set of primitives based on the geometry data; and performing, by the one or more processors, a rasterizing step of the graphics pipeline in order to generate the one or more reference images based on the set of primitives.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method for generating a rendered image, the method comprising:

obtaining, by one or more processors, a plurality of Gaussian elements, wherein, for each Gaussian element of the plurality of Gaussian elements, the Gaussian element is defined by parameter values of a parameter set for the Gaussian element, the parameter set including a learnable parameter vector of the Gaussian element, a learnable weight vector of the Gaussian element comprising one or more learnable weight values, and a spherical harmonics (SH) coefficient array of the Gaussian element, the SH coefficient array of the Gaussian element being an array of 3D color vectors corresponding to SH coefficients; and rasterizing the Gaussian elements to generate a rendered image of a scene as viewable from a camera position, wherein rasterizing the Gaussian elements comprises, for at least one camera ray extending from the camera position:

determining an opacity value for a location based on a view-dependent scaling value that depends on the camera position and a learnable parameter vector of a Gaussian element of the plurality of Gaussian elements that intersects the camera ray;

determining a view-dependent color vector for the Gaussian element based on the camera position, a position vector of the Gaussian element, and the SH coefficient array of the Gaussian element;

calculating a depth term for the Gaussian element based on a depth of the Gaussian element and the learnable weight vector for the Gaussian element; and generating a rendered color vector for a pixel that corresponds to the camera ray based on the opacity value for the Gaussian element, the view-dependent color vector for the Gaussian element, and the depth term for the Gaussian element.

2. The method of claim 1, wherein the method further comprises:

obtaining, by the one or more processors, one or more reference images of a scene, wherein each respective reference image of the one or more reference images is associated with a respective camera position from which the respective reference image is virtually or physically captured;

generating, by the one or more processors, a plurality of initial Gaussian elements based on the one or more reference images;

performing, by the one or more processors, one or more iterations of a training process, wherein performing each of the one or more iterations of the training process comprises:

rasterizing current Gaussian elements to generate a current rendered image of the scene as viewable from a current camera position, wherein:

during at least an initial iteration of the one or more iterations, the initial Gaussian elements are the current Gaussian elements, the current camera position is the camera position associated with a current reference image, and rasterizing the current Gaussian elements comprises, for each camera ray of a plurality of camera rays extending from the current camera position:

for each current Gaussian element of the current Gaussian elements that intersects the camera ray:

determining an opacity value for a location based on a view-dependent scaling value that depends on the current camera position and a learnable parameter vector for the current Gaussian element;

determining a view-dependent color vector for the current Gaussian element based on the current camera position, a position vector of the current Gaussian element, and the SH coefficient array of the current Gaussian element;

generating a rendered color vector for a pixel in the rendered image that corresponds to the camera ray, wherein generating the rendered color vector for the pixel comprises:

for each current Gaussian element of the current Gaussian elements that intersects the camera ray, calculating a depth term for the current Gaussian element based on a depth of the current Gaussian element and the learnable weight vector for the current Gaussian element; and generating the rendered color vector for the pixel based on the opacity values for the current Gaussian elements that intersect the camera ray, the view-dependent color vectors for the current Gaussian elements that intersect the camera ray, and the depth terms for the current Gaussian elements that intersect the camera ray; and adjusting the parameter values of the parameter sets of the current Gaussian elements based on differences between the rendered image and the current reference image.

3. The method of claim 2, wherein adjusting the parameter values of the parameter sets of the current Gaussian elements comprises adjusting the parameter values of the parameter sets of the current Gaussian elements to minimize a loss function given by $$L = \frac{1}{VHW} \sum_{v=1}^{V} \sum_{m=1}^{H} \sum_{n=1}^{W} D(r_v[m, n], s_v[m, n])$$

where L is a loss value, V indicates a quantity of rendered images and reference images, H indicates the quantity of rows of pixels in the rendered images and the reference images, W indicates a quantity of columns of pixels in the rendered images and the reference images, $r_v$ indicates pixels of rendered image v, $s_v$ indicates pixels of a current reference image corresponding to the rendered image v, and D indicates a difference between corresponding pixels of the rendered image v and the current reference image.

4. The method of claim 3, wherein:

the color vectors for the pixels in the rendered image are computed in a first rendering pass, and adjusting the parameter values of the parameter sets of the current Gaussian elements comprises computing gradients of the loss function in a second pass.

5. The method of claim 2, wherein the camera position is different from camera positions associated with any of the one or more reference images.

6. The method of claim 1, wherein calculating the depth term for the Gaussian element comprises:

calculating the depth term for the Gaussian element as $e^{-d(z_i,w)}$, where e is Euler's number, $z_i$ is the depth of the Gaussian element, w is the learnable weight vector for the Gaussian element, and d is a function based on the depth of the Gaussian element the learnable weight vector for the Gaussian element.

7. The method of claim 6, wherein the function based on the depth of the Gaussian element the learnable weight vector for the Gaussian element is defined as $d(z_j,w)=w_o|z_i|^{w_1}$, where $w_0$ and $w_1$ are weights in the learnable weight vector for the Gaussian element.

8. The method of claim 1, wherein calculating the depth term for the Gaussian element comprises calculating $$W(z_i; \sigma_i, v_i) = v_i \max\left(0, 1 - \frac{z_i}{\sigma_i}\right)$$

where W is the depth term, $z_i$ is the depth of the Gaussian element, $\sigma_i$ and $v_i$ are learnable values in the learnable weight vector for the Gaussian element.

9. The method of claim 1, wherein generating the rendered color vector for the pixel based on the opacity values for the Gaussian element, the view-dependent color vectors for the Gaussian element, and the depth term for the Gaussian element comprises:

calculating the rendered color vector for the pixel as:

$$r[m, n] = \overline{\alpha}[m, n]c_0[m, n] + (1 - \overline{\alpha}[m, n]) \frac{\sum_{i=1}^{N} c_i[m, n]\, \alpha_i[m, n]\, W(z_i; w_i)}{\sum_{i=1}^{N} \alpha_i[m, n]\, W(z_i; w_i)},$$

where [m,n] are coordinates of the pixel, $c_0$[m,n] is a background color for the camera ray associated with the pixel, N is a total quantity of Gaussian elements that intersect the camera ray, $c_i$[m,n] is the view-dependent color vector for a Gaussian element i of the Gaussian elements that intersect the camera ray, $\alpha_i$[m,n] is the opacity value for the Gaussian element i at a location along the camera ray that intersects the Gaussian element i, $W(z_i;w_i)$ is the depth term for the Gaussian element i, where $z_i$ is a depth of the Gaussian element i and $w_i$ is the learnable weight vector of the Gaussian element, and $$\overline{\alpha}[m, n] = \prod_{i=1}^{N} (1 - \alpha_i[m, n]).$$

10. The method of claim 1, wherein generating the rendered color vector for the pixel comprises:

calculating a numerator value as a sum of first terms for Gaussian elements that intersect the camera ray, wherein calculating the numerator value comprises, for each of the Gaussian elements that intersects the camera ray, calculating a first term for the Gaussian element based on a multiplication of a value of a color component in the view-dependent color vector for the Gaussian element by the opacity value for the Gaussian element and an exponential function of the depth term for the Gaussian element;

calculating a denominator value as a sum of second terms for the Gaussian elements that intersect the camera ray, wherein calculating the denominator value comprises, for each of the Gaussian elements that intersects the camera ray, calculating a second term for the Gaussian element based on a multiplication of the opacity value for the Gaussian element and the exponential function of the depth term for the Gaussian element; and calculating a value of the color component in the rendered color vector for the pixel based on a division of the numerator value by the denominator value.

11. The method of claim 1, wherein:

the parameter set for the Gaussian element further includes a first additional learnable parameter and a second additional learnable parameter, generating the color vector for the Gaussian element comprises calculating the color vector for the Gaussian element as:

$$c(f-p, h) = a + x(f-p, h)b$$

where c(f−p, h) is the color vector for the Gaussian element, f is a vector for the current camera position, p is the position vector of the Gaussian element, h is the SH coefficient array of the Gaussian element, a is the first additional parameter, b is the second additional parameter, and x is a scalar factor.

12. The method of claim 1, further comprising:

executing, by the one or more processors, an application that generates geometry data;

performing, by the one or more processors, a geometry processing step of a graphics pipeline in order to generate a set of primitives based on the geometry data; and performing, by the one or more processors, a rasterizing step of the graphics pipeline in order to generate the one or more reference images based on the set of primitives.

13. A computing system comprising:

one or more memories storing a plurality of Gaussian elements, wherein, for each Gaussian element of the plurality of Gaussian elements, the Gaussian element is defined by parameter values of a parameter set for the Gaussian element, the parameter set including a learnable parameter vector of the Gaussian element, a learnable weight vector of the Gaussian element comprising one or more learnable weight values, and a spherical harmonics (SH) coefficient array of the Gaussian element, the SH coefficient array of the Gaussian element being an array of 3D color vectors corresponding to SH coefficients; and one or more processors implemented in circuitry and communicatively coupled to the one or more memories, the one or more processors configured to perform operations comprising rasterizing the Gaussian elements to generate a rendered image of a scene as viewable from a camera position, wherein rasterizing the Gaussian elements comprises, for at least one camera ray extending from the camera position:

determining an opacity value for a location based on a view-dependent scaling value that depends on the camera position and a learnable parameter vector of a Gaussian element of the plurality of Gaussian elements that intersects the camera ray;

determining a view-dependent color vector for the Gaussian element based on the camera position, a position vector of the Gaussian element, and the SH coefficient array of the Gaussian element;

calculating a depth term for the Gaussian element based on a depth of the Gaussian element and the learnable weight vector for the Gaussian element; and generating a rendered color vector for a pixel that corresponds to the camera ray based on the opacity value for the Gaussian element, the view-dependent color vector for the Gaussian element, and the depth term for the Gaussian element.

14. The computing system of claim 13, wherein the one or more processors are further configured to perform operations comprising:

obtaining one or more reference images of a scene, wherein each respective reference image of the one or more reference images is associated with a respective camera position from which the respective reference image is virtually or physically captured;

generating a plurality of initial Gaussian elements based on the one or more reference images;

performing one or more iterations of a training process, wherein performing each of the one or more iterations of the training process comprises:

rasterizing current Gaussian elements to generate a current rendered image of the scene as viewable from a current camera position, wherein:

during at least an initial iteration of the one or more iterations, the initial Gaussian elements are the current Gaussian elements, the current camera position is the camera position associated with a current reference image, and rasterizing the current Gaussian elements comprises, for each camera ray of a plurality of camera rays extending from the current camera position:

for each current Gaussian element of the current Gaussian elements that intersects the camera ray:

determining an opacity value for a location based on a view-dependent scaling value that depends on the current camera position and a learnable parameter vector for the current Gaussian element;

determining a view-dependent color vector for the current Gaussian element based on the current camera position, a position vector of the current Gaussian element, and the SH coefficient array of the current Gaussian element;

generating a rendered color vector for a pixel in the rendered image that corresponds to the camera ray, wherein generating the rendered color vector for the pixel comprises:

for each current Gaussian element of the current Gaussian elements that intersects the camera ray, calculating a depth term for the current Gaussian element based on a depth of the current Gaussian element and the learnable weight vector for the current Gaussian element; and generating the rendered color vector for the pixel based on the opacity values for the current Gaussian elements that intersect the camera ray, the view-dependent color vectors for the current Gaussian elements that intersect the camera ray, and the depth terms for the current Gaussian elements that intersect the camera ray; and adjusting the parameter values of the parameter sets of the current Gaussian elements based on differences between the rendered image and the current reference image.

15. The computing system of claim 14, wherein adjusting the parameter values of the parameter sets of the current Gaussian elements comprises adjusting the parameter values of the parameter sets of the current Gaussian elements to minimize a loss function given by $$L = \frac{1}{VHW}\sum_{v=1}^{V}\sum_{m=1}^{H}\sum_{n=1}^{W} D(r_v[m, n], s_v[m, n])$$

where L is a loss value, V indicates a quantity of rendered images and reference images, H indicates the quantity of rows of pixels in the rendered images and the reference images, W indicates a quantity of columns of pixels in the rendered images and the reference images, $r_v$ indicates pixels of rendered image v, $s_v$ indicates pixels of a current reference image corresponding to the rendered image v, and D indicates a difference between corresponding pixels of the rendered image v and the current reference image.

16. The computing system of claim 15, wherein:

the color vectors for the pixels in the rendered image are computed in a first rendering pass, and adjusting the parameter values of the parameter sets of the current Gaussian elements comprises computing gradients of the loss function in a second pass.

17. The computing system of claim 14, wherein the camera position is different from camera positions associated with any of the one or more reference images.

18. The computing system of claim 13, wherein calculating the depth term for the Gaussian element comprises:

calculating the depth term for the Gaussian element as $e^{-d(z_i,w)}$, where e is Euler's number, $z_i$ is the depth of the Gaussian element, w is the learnable weight vector for the Gaussian element, and d is a function based on the depth of the Gaussian element the learnable weight vector for the Gaussian element.

19. The computing system of claim 18, wherein the function based on the depth of the Gaussian element the learnable weight vector for the Gaussian element is defined as $d(z_i, w)=w_o|z_i|^{w_1}$, where $w_0$ and $w_1$ are weights in the learnable weight vector for the Gaussian element.

20. The computing system of claim 13, wherein calculating the depth term for the Gaussian element comprises calculating $$W(z_i; \sigma_i, v_i) = v_i \max\left(0, 1 - \frac{z_i}{\sigma_i}\right)$$

where W is the depth term, $z_i$ is the depth of the Gaussian element, $\sigma_i$ and $v_i$ are learnable values in the learnable weight vector for the Gaussian element.

21. The computing system of claim 13, wherein generating the rendered color vector for the pixel based on the opacity values for the Gaussian element, the view-dependent color vectors for the Gaussian element, and the depth term for the Gaussian element comprises:

calculating the rendered color vector for the pixel as:

$$r[m, n] = \overline{\alpha}[m, n]c_0[m, n] + (1 - \overline{\alpha}[m, n])\frac{\sum_{i=1}^{N} c_i[m, n]\,\alpha_i[m, n]\,W(z_i; w_i)}{\sum_{i=1}^{N} \alpha_i[m, n]\,W(z_i; w_i)},$$

where [m,n] are coordinates of the pixel, $c_0$[m,n] is a background color for the camera ray associated with the pixel, N is a total quantity of Gaussian elements that intersect the camera ray, $c_i$[m,n] is the view-dependent color vector for a Gaussian element i of the Gaussian elements that intersect the camera ray, $\alpha_i$[m,n] is the opacity value for the Gaussian element i at a location along the camera ray that intersects the Gaussian element i, $W(z_i;w_i)$ is the depth term for the Gaussian element i, where $z_i$ is a depth of the Gaussian element i and $w_i$ is the learnable weight vector of the Gaussian element, and $$\overline{\alpha}[m, n] = \prod_{i=1}^{N}(1 - \alpha_i[m, n]).$$

22. The computing system of claim 13, wherein generating the rendered color vector for the pixel comprises:

calculating a numerator value as a sum of first terms for Gaussian elements that intersect the camera ray, wherein calculating the numerator value comprises, for each of the Gaussian elements that intersects the camera ray, calculating a first term for the Gaussian element based on a multiplication of a value of a color component in the view-dependent color vector for the Gaussian element by the opacity value for the Gaussian element and an exponential function of the depth term for the Gaussian element;

calculating a denominator value as a sum of second terms for the Gaussian elements that intersect the camera ray, wherein calculating the denominator value comprises, for each of the Gaussian elements that intersects the camera ray, calculating a second term for the Gaussian element based on a multiplication of the opacity value for the Gaussian element and the exponential function of the depth term for the Gaussian element; and calculating a value of the color component in the rendered color vector for the pixel based on a division of the numerator value by the denominator value.

23. The computing system of claim 13, wherein:

the parameter set for the Gaussian element further includes a first additional learnable parameter and a second additional learnable parameter, generating the color vector for the Gaussian element comprises calculating the color vector for the Gaussian element as:

$$c(f - p, h) = a + x(f - p, h)\,b$$

where c(f−p, h) is the color vector for the Gaussian element, f is a vector for the current camera position, p is the position vector of the Gaussian element, h is the SH coefficient array of the Gaussian element, a is the first additional parameter, b is the second additional parameter, and x is a scalar factor.

24. The computing system of claim 13, further comprising:

executing, by the one or more processors, an application that generates geometry data;

performing, by the one or more processors, a geometry processing step of a graphics pipeline in order to generate a set of primitives based on the geometry data; and performing, by the one or more processors, a rasterizing step of the graphics pipeline in order to generate the one or more reference images based on the set of primitives.

* * * * *